(12) United States Patent
Ohta et al.

(10) Patent No.: US 12,108,279 B2
(45) Date of Patent: Oct. 1, 2024

(54) WIRELESS COMMUNICATION APPARATUS AND WIRELESS COMMUNICATION SYSTEM

(71) Applicant: FUJITSU LIMITED, Kawasaki (JP)

(72) Inventors: Yoshiaki Ohta, Yokohama (JP);
Takayoshi Ode, Yokohama (JP);
Shinichiro Aikawa, Yokohama (JP);
Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 154 days.

(21) Appl. No.: 16/437,831

(22) Filed: Jun. 11, 2019

(65) Prior Publication Data

US 2019/0297530 A1 Sep. 26, 2019

Related U.S. Application Data

(63) Continuation of application No. PCT/JP2017/017105, filed on Apr. 28, 2017.

(30) Foreign Application Priority Data

Jan. 6, 2017 (WO) .................. PCT/JP2017/000350

(51) Int. Cl.
*H04W 28/06* (2009.01)
*H04L 47/32* (2022.01)
(Continued)

(52) U.S. Cl.
CPC ............. *H04W 28/06* (2013.01); *H04L 47/32* (2013.01); *H04L 47/34* (2013.01); *H04L 65/40* (2013.01);
(Continued)

(58) Field of Classification Search
CPC ... H04W 28/06; H04W 68/005; H04W 80/02; H04W 80/08; H04L 29/08; H04L 47/32; H04L 47/34; H04L 1/1838; H04L 1/1841
See application file for complete search history.

(56) References Cited

U.S. PATENT DOCUMENTS 6,330,435 B1 12/2001 Lazraq et al.
7,480,308 B1 * 1/2009 Cohen ..................... H04L 47/10
370/412

(Continued)

FOREIGN PATENT DOCUMENTS

JP 2002-539713 A 11/2002
JP 2010-541485 A 12/2010
(Continued)

OTHER PUBLICATIONS

3GPP TS 36.300 V14.1.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Dec. 2016.
(Continued)

*Primary Examiner* — Chirag G Shah
*Assistant Examiner* — Joshua Smith
(74) *Attorney, Agent, or Firm* — Myers Wolin, LLC

(57) ABSTRACT

A first wireless communication apparatus includes: a controller configured to perform numbering of multiple pieces of data and transmit the multiple pieces of data that are numbered, to a second wireless communication apparatus, and perform first processing in a case where, among the multiple pieces of data, specific data is discarded after the numbering and before the transmission, wherein the first processing is configured to transmit the multiple pieces of data subsequent to the discarding to the second wireless communication apparatus without renumbering, and trans-
(Continued)

mit discarding notification information that notifies the discarding, to the second wireless communication apparatus.

16 Claims, 28 Drawing Sheets

(51) Int. Cl.
    *H04L 47/34*    (2022.01)
    *H04L 65/40*    (2022.01)
    *H04W 68/00*    (2009.01)
    *H04W 80/02*    (2009.01)
    *H04W 80/08*    (2009.01)

(52) U.S. Cl.
    CPC ......... *H04W 68/005* (2013.01); *H04W 80/02* (2013.01); *H04W 80/08* (2013.01)

(56) References Cited

U.S. PATENT DOCUMENTS

| | | | |
|---|---|---|---|
| 2002/0110095 A1* | 8/2002 | Jiang | H04W 12/03 370/328 |
| 2009/0103478 A1 | 4/2009 | Sammour et al. | |
| 2009/0163211 A1* | 6/2009 | Kitazoe | H04W 74/0866 455/436 |
| 2010/0296449 A1 | 11/2010 | Ishii et al. | |
| 2013/0070682 A1* | 3/2013 | Kim | H04L 5/001 370/328 |
| 2013/0188648 A1 | 7/2013 | Nakatsugawa | |
| 2013/0315202 A1* | 11/2013 | May | H04W 36/023 370/331 |
| 2014/0269294 A1* | 9/2014 | Morandin | H04L 47/27 370/234 |
| 2015/0117427 A1* | 4/2015 | Park | H04L 47/628 370/338 |
| 2015/0124610 A1* | 5/2015 | Barrass | H04L 47/12 370/235 |
| 2015/0271726 A1* | 9/2015 | Kim | H04W 76/15 370/329 |
| 2015/0280905 A1* | 10/2015 | Shah | H04L 47/34 370/504 |
| 2017/0303170 A1* | 10/2017 | Uchino | H04W 76/15 |

FOREIGN PATENT DOCUMENTS

| | | |
|---|---|---|
| JP | 2013-153352 A | 8/2013 |
| WO | 2009/081871 A1 | 7/2009 |

OTHER PUBLICATIONS

3GPP TS 36.211 V14.1.0, 3rd Generation Partnership Project; Technical Specification Group Radio Access Network; Evolved Universal Terrestrial Radio Access (E-UTRA); Physical channels and modulation (Release 14), Dec. 2016.
3GPP TS 36.212 V14.1.0, 3rd Generation Partnership Project; Technical Specification Group Radio Access Network; Evolved Universal Terrestrial Radio Access (E-UTRA); Multiplexing and channel coding (Release 14), Dec. 2016.
3GPP TS 36.213 V14.1.0, 3rd Generation Partnership Project; Technical Specification Group Radio Access Network; Evolved Universal Terrestrial Radio Access (E-UTRA); Physical layer procedures (Release 14), Dec. 2016.
3GPP TS 36.321 V14.1.0, 3rd Generation Partnership Project; Technical Specification Group Radio Access Network; Evolved Universal Terrestrial Radio Access (E-UTRA); Medium Access Control (MAC) protocol specification (Release 14), Dec. 2016.
3GPP TS 36.322 V13.2.0, 3rd Generation Partnership Project; Technical Specification Group Radio Access Network; Evolved Universal Terrestrial Radio Access (E-UTRA); Radio Link Control (RLC) protocol specification (Release 13), Jun. 2016.
3GPP TS 36.323 V14.1.0, 3rd Generation Partnership Project; Technical Specification Group Radio Access Network; Evolved Universal Terrestrial Radio Access (E-UTRA); Packet Data Convergence Protocol (PDCP) specification (Release 14), Dec. 2016.
3GPP TS 36.331 V14.1.0, 3rd Generation Partnership Project; Technical Specification Group Radio Access Network; Evolved Universal Terrestrial Radio Access (E-UTRA); Radio Resource Control (RRC); Protocol specification (Release 14), Dec. 2016.
3GPP TS 36.413 V14.1.0, 3rd Generation Partnership Project; Technical Specification Group Radio Access Network; Evolved Universal Terrestrial Radio Access Network (E-UTRAN); S1 Application Protocol (S1AP) (Release 14), Jan. 2017.
3GPP TS 36.423 V14.1.0, 3rd Generation Partnership Project; Technical Specification Group Radio Access Network; Evolved Universal Terrestrial Radio Access Network (E-UTRAN); X2 application protocol (X2AP) (Release 14), Jan. 2017.
3GPP TS 36.425 V13.1.1, 3rd Generation Partnership Project; Technical Specification Group Radio Access Network; Evolved Universal Terrestrial Radio Access Network (E-UTRAN); X2 interface user plane protocol (Release 13), Sep. 2016.
3GPP TS 38.912 V0.0.2, 3rd Generation Partnership Project; Technical Specification Group Radio Access Network; Study on New Radio Access Technology (Release 14), Sep. 2016, clean version.
3GPP TR 38.913 V14.1.0, 3rd Generation Partnership Project; Technical Specification Group Radio Access Network; Study on Scenarios and Requirements for Next Generation Access Technologies; (Release 14), Dec. 2016.
3GPP TR 38.801 V1.0.0, 3rd Generation Partnership Project; Technical Specification Group Radio Access Network; Study on New Radio Access Technology; Radio Access Architecture and Interfaces (Release 14), Dec. 2016.
3GPP TR 38.802 V1.0.0, 3rd Generation Partnership Project; Technical Specification Group Radio Access Network; Study on New Radio (NR) Access Technology Physical Layer Aspects (Release 14), Nov. 2016.
3GPP TR 38.803 V1.0.0, 3rd Generation Partnership Project; Technical Specification Group Radio Access Network; Study on New Radio Access Technology; RF and co-existence aspects (Release 14), Dec. 2016, clean version.
3GPP TR 38.804 V0.4.0, 3rd Generation Partnership Project; Technical Specification Group Radio Access Network; Study on New Radio Access Technology; Radio Interface Protocol Aspects (Release 14), Nov. 2016.
3GPP TR 38.900 V14.2.0, 3rd Generation Partnership Project; Technical Specification Group Radio Access Network; Study on channel model for frequency spectrum above 6 GHZ (Release 14), Dec. 2016.
ITU-R, "IMT Vision—Framework and overall objectives of the future development of IMT for 2020 and beyond", Recommendation ITU-R M.2083-0, Sep. 2015, retrieved from [http://www.itu.int/dms_pubrec/itu-r/rec/m/R-REC-M.2083-0-201509-I !! PDF-E.pdf].
Ericsson "Report from [95##26] Concatenation", Agenda Item: 9.2.1.1, 3GPP TSG-RAN WG2 meeting #95bis, R2-166904, Kaohsiung, Taiwan, Oct. 10-14, 2016, retrieved from [http://www.3gpp.org/ftp/TSG_RAN/WG2_RL2/TSGR2_95bis/Docs/R2-166904.zip].
Ericsson et al., "Reset procedure for RLC", Agenda Item: 5.1.2.2, 3GPP TSG-RAN WG2 meeting #60bis, R2-080234, Sevilla, Spain, Nov. 14-18, 2007, retrieved from [http://www.3gpp.org/ftp/tsg_ran/wg2_rl2/TSGR2_60bis/Docs/R2-080234.zip].
International Search Report and Written Opinion of the International Searching Authority issued by the Japan Patent Office for corresponding International Patent Application No. PCT/JP2017/017105, mailed on Jul. 25, 2017, with an English translation.
3GPP TR 38.803 V1.0.0, 3rd Generation Partnership Project; Technical Specification Group Radio Access Network; Study on New Radio Access Technology; RF and co-existence aspects (Release 14), Dec. 2016, marked up version.
3GPP TR 38.912 V0.0.2, 3rd Generation Partnership Project; Technical Specification Group Radio Access Network; Study on New Radio Access Technology (Release 14), Sep. 2016, marked up version.

(56) References Cited

OTHER PUBLICATIONS

Notice of Reasons for Refusal issued by the Japan Patent Office for corresponding Japanese Patent Application No. 2018-560312, mailed on Feb. 2, 2021, with an English machine translation.

* cited by examiner

FIG. 7A

| | | |
|---|---|---|
| R | First Missing SN (FMS) | Oct 1 |
| | First Missing SN (FMS) | Oct 2 |
| R | Last Missing SN (LMS) | Oct 3 |
| | Last Missing SN (LMS) | Oct 4 |

FIG. 7B

| | | |
|---|---|---|
| R | First Missing SN (FMS) | Oct 1 |
| | First Missing SN (FMS) | Oct 2 |
| E | Last Missing SN (LMS) | Oct 3 |
| | Last Missing SN (LMS) | Oct 4 |

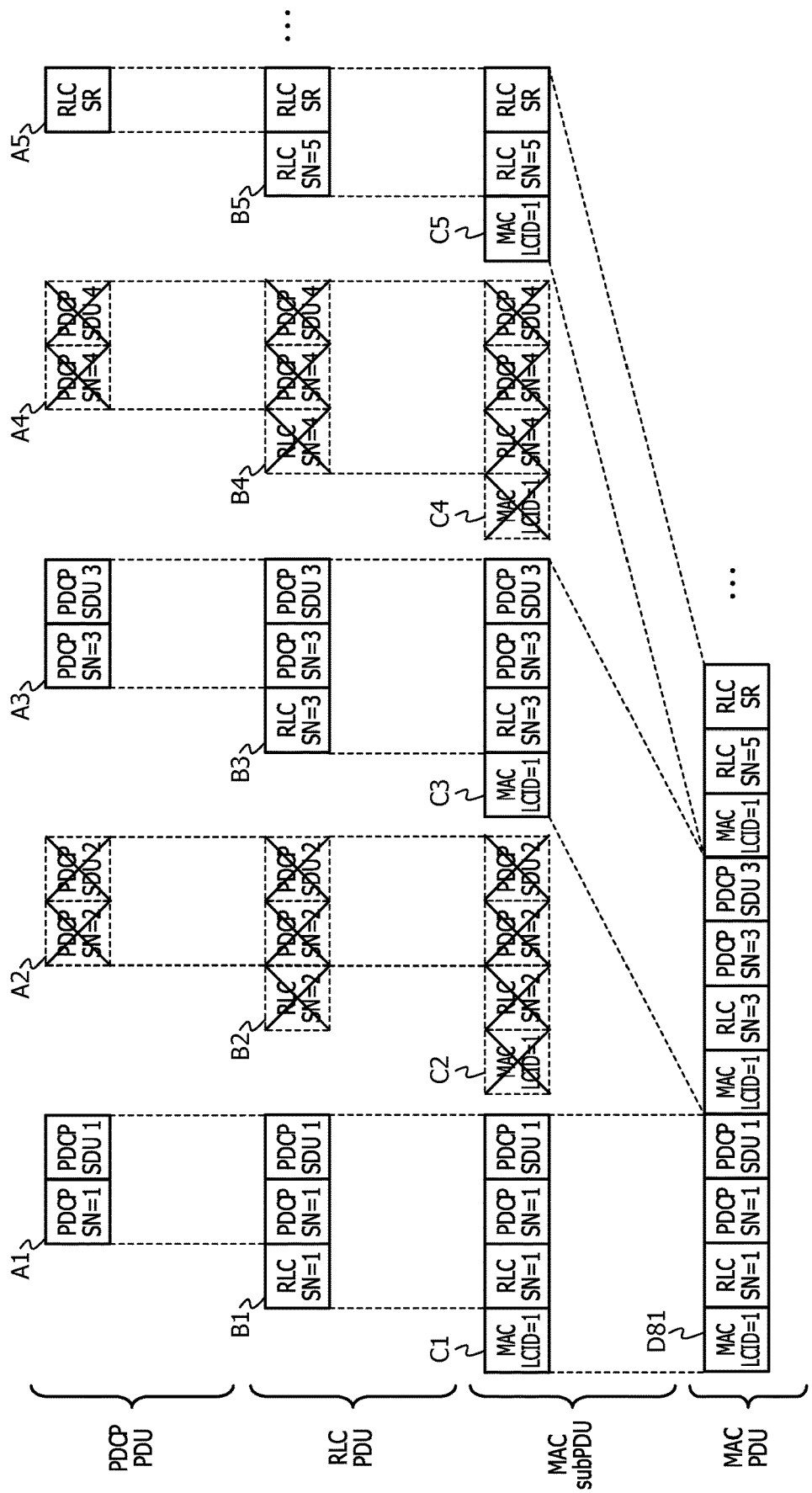

| MAC LCID=1 | RLC SN=1 | PDCP SN=1 | PDCP SDU 1 | MAC LCID=1 | RLC SN=3 | PDCP SN=3 | PDCP SDU 3 | MAC LCID=2 | RLC SN=1 | PDCP SN=1 | PDCP SDU 1 | MAC LCID=1 | RLC SN=5 | PDCP SR | MAC LCID=2 | RLC SR |

| MAC LCID=1 | RLC SN=1 | PDCP SN=1 | PDCP SDU 1 | MAC LCID=1 | RLC SN=3 | PDCP SN=3 | PDCP SDU 3 | MAC LCID=2 | RLC SN=1 | PDCP SN=1 | PDCP SDU 1 | MAC LCID=1 | RLC SN=5 | PDCP SR | MAC LCID=2 | RLC SN=5 | MAC LCID=1 | RLC SR | PDCP SR | MAC LCID=2 | RLC SR |

| MAC LCID=1 | RLC SN=1 | PDCP SN=1 | PDCP SDU 1 | MAC LCID=1 | RLC SN=3 | PDCP SN=3 | PDCP SDU 3 | MAC LCID=2 | RLC SN=1 | PDCP SR | MAC LCID=1 | RLC SN=5 | PDCP SN=1 | PDCP SDU 1 | MAC LCID=2 | RLC SN=5 | PDCP SR | MAC LCID=1 | RLC SR | MAC LCID=2 | RLC SR |

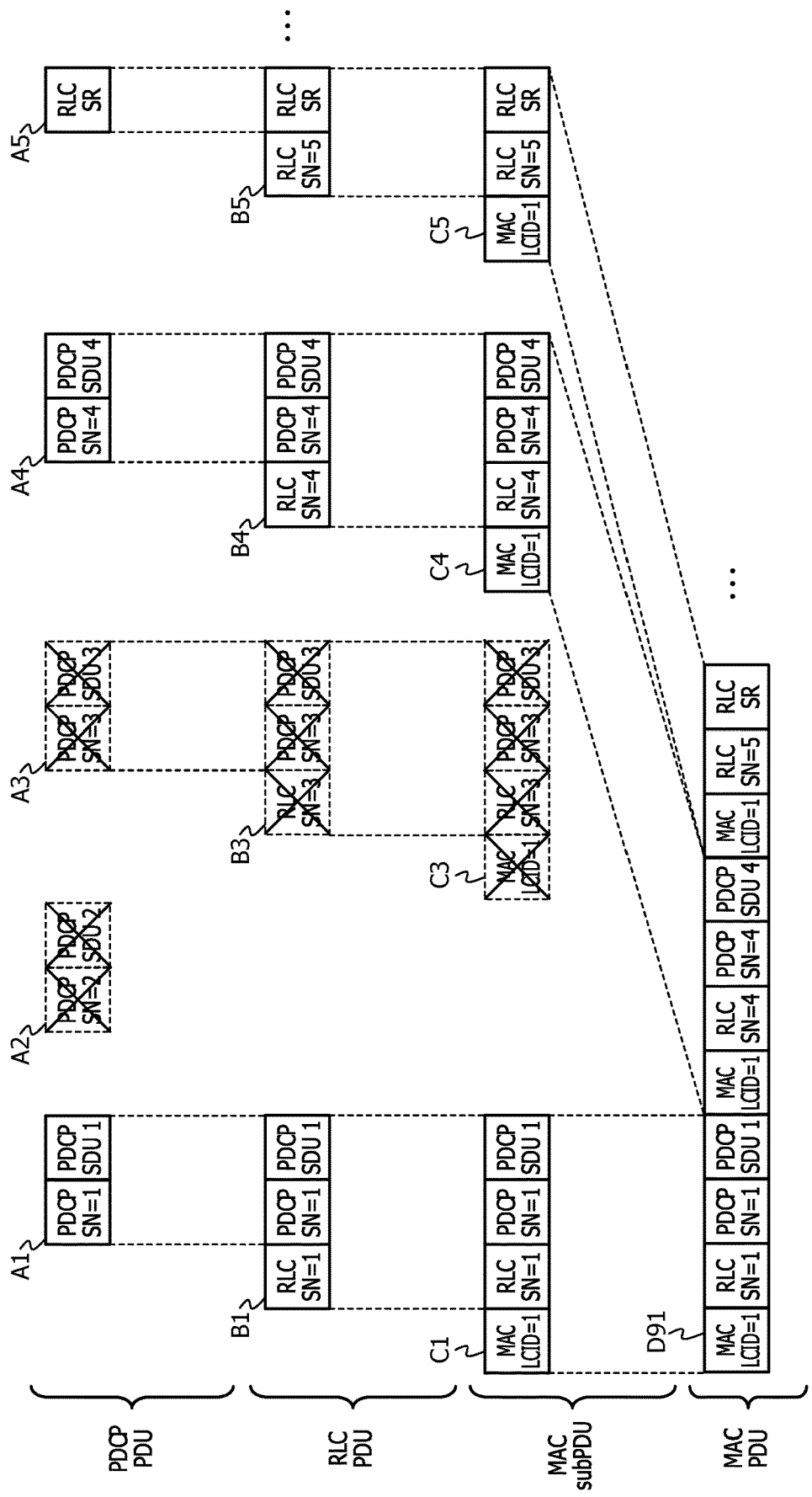

WIRELESS COMMUNICATION APPARATUS AND WIRELESS COMMUNICATION SYSTEM

CROSS-REFERENCE TO RELATED APPLICATION

This application is a continuation application of International Application PCT/JP2017/017105 filed on Apr. 28, 2017 and designated the U.S., the entire contents of which are incorporated herein by reference. The International Application PCT/JP2017/017105 is based upon and claims the benefit of priority of the prior International Application PCT/JP2017/000350, filed on Jan. 6, 2017, the entire contents of which are incorporated herein by reference.

FIELD

The embodiments discussed herein are related to a wireless communication apparatus and a wireless communication system.

BACKGROUND

In recent years, a discussion on next generation wireless communication technologies has been made to further enhance high-speed and high-capacity wireless communication, and the like in a wireless communication system (hereinafter also referred to as a mobile communication system) (unless specified otherwise, the wireless communication is also referred to as mobile communication) such as a portable phone system (cellular system). For example, the 3rd Generation Partnership Project (3GPP) that is a standardization organization, communication standards called Long Term Evolution (LTE) and communication standards called LTE-Advanced (LTE-A) that is based on an LTE wireless communication technology have already been established as specifications, and a study has been continuously made to extend functionalities of LTE and LTE-A. For example, a discussion has been made on standardization of a 5th generation mobile communication system (also referred to as a 5G system) that realizes contents of an operational scenario or a technical requirement that is proposed from the International Telecommunication Union Radio communications sector (ITU-R).

In the communication standards for the wireless communication system, generally, specifications are stipulated as protocol stacks (also referred to as a hierarchical-type protocol) that result from dividing functionalities of wireless communication into a sequence of layers. For example, a physical layer is stipulated as the first layer, a data link layer is stipulated as the second layer, and a network layer is stipulated as the third layer. In the fourth generation mobile communication system such as LTE, the second layer is divided into multiple sublayers and is made up of a Medium Access Control (MAC), a Radio Link Control (RLC) layer, and a Packet Data Convergence Protocol (PDCP). Furthermore, in the fourth generation mobile communication system, the first layer is made up of a physical (PHY) layer, and the third layer is made up of a Radio Resource Control (RRC) layer (the RRC layer is only for a control plane). It is noted that the MAC layer, the RLC layer, and the PDCP layer, as described above, are sublayers of the second layer, and that, because of this, these may be a MAC sublayer, an RLC sublayer, and a PDCP sublayer, respectively.

Each layer in a transmission apparatus in the wireless communication system performs processing in compliance with a prescribed protocol, such as assigning of a header, on a data block from a higher layer (also referred to as a service data unit (SDU)), and thus generates a protocol data unit (PDU) that is an information unit which is exchanged between peer processes in a reception apparatus, and transfers the generated PDU to a lower layer. For example, in the RLC layer of LTE, a PDCP-PDU, which is a data block from the PDCP layer that is the higher layer is defined as an RLC-SDU, multiple RLC-SDUs are concatenated in a range of converging to a length of a transport block (TB) that is notified by the lower layer, and so forth. Thus, an RLC-PDU is generated. This RLC-PDU is transferred to the MAC layer that is the lower layer, in a state where an RLC header that has a sequence number (SN) in the RLC layer is added.

Each layer in the reception apparatus in the wireless communication system receives a data block from the lower layer (also referred to as a PDU) and transfers a data block that is extracted by an operation such as removal of the header (also referred to as an SDU), to the higher layer. For example, in the RLC of LTE, processing, such as reconfiguring multiple RLC-SDUs that are stored in one RLC-PDU, is performed, referring to the RLC header that is added to the data block from the MAC layer that is the lower layer (also referred to as a MAC-SDU or the RLC-PDU), and the RLC-SDU is transferred to the PDCP layer that is the higher layer. At that time, in order to correct the order of the RLC-SDUs for the higher layer, ordering processing that is based on an RLC sequence number that is retained by the RLC header is performed for reconfiguration of the RLC-SDU. Then, in a case where it is detected that the RLC sequence number is missing, an RLC retransmission control that requests the transmission apparatus to retransmit the RLC-PDU is performed.

Incidentally, in the next generation mobile communication system subsequent to the fifth generation mobile communication system, for example, a service which requires low latency at a different from that in the related art, such as tactile communication or augmented reality, is expected to appear. One of requirements for realization of this service is Ultra-Reliable and Low-Latency Communications (URLLC) in the fifth generation mobile communication system. For example, whereas a latency of 10 [milliseconds] between a transmission source of a packet to a transmission destination in a wireless section is assumed in LTE that is the fourth generation mobile communication system, a latency of 1 [millisecond] or shorter is a goal to be realized in the fifth generation mobile communication system.

In Technical Specification Group—Radio Access Network Working Group 2 (TSG-RAN WG2) that is one of the working groups of the 3GPP, a study has been made on revision of a redundant configuration of each layer for the purpose of realization of the Ultra-Reliable and Low-latency Communications in the 5th mobile communication system. For example, in LTE, processing relating to data concatenation in the MAC layer is also stipulated in addition to concatenation of pieces of data in the RLC layer described above, and redundancies of the RLC layer and the MAC layer are pointed out. Thus, in order to solve a problem of the redundancy, several solutions for excluding processing relating to the data concatenation from the RLC layer have been proposed.

Examples of the related art include NPL-1[3GPP TS36.300 v14.1.0 (December 2016)], NPL-2[3GPP TS36.211 v14.1.0 (December 2016)], NPL-3[3GPP TS36.212 v14.1.0 (December 2016)], NPL-4[3GPP TS36.213 v14.1.0 (December 2016)], NPL-5[3GPP TS36.321 v14.1.0 (December 2016)], NPL-6[3GPP TS36.322 v13.2.0 (June 2016)], NPL-7[3GPP TS36.323 v14.1.0 (December 2016)], NPL-8[3GPP TS36.331v14.1.0 (December 2016)], NPL-9[3GPP TS36.413 v14.1.0 (January 2017)], NPL-10[3GPP TS36.423 v14.1.0 (January 2017)], NPL-11[3GPP TS36.425 v13.1.1 (September 2016)], NPL-12[3GPP TR38.912 v0.0.2 (September 2016)], NPL-13[3GPP TR38.913 v14.1.0 (December 2016)], NPL-14[3GPP TR38.801 v1.0.0 (December 2016)], NPL-15 [3GPP TR38.802 v1.0.0 (November 2016)], NPL-16[3GPP TR38.803 v1.0.0 (December 2016)], NPL-17[3GPP TR38.804 v0.4.0 (November 2016)], NPL-18[3GPP TR38.900 v14.2.0 (December 2016)], NPL-19[ITU-R: "IMT Vision—Framework and overall objectives of the future development of IMT for 2020 and beyond", Recommendation ITU-R M.2083-0, September 2015; http://www.itu.int/dms.pubrec/itu-r/rec/m/R-REC-M.2083-0-201509-I!!PDF-E.pdf], NPL-20[Ericsson: "Report from [95 #26] Concatenation" 3GPP TSG-RAN WG2 #95bis, R2-166904, October 2016; http://www.3gpp.org/ftp/TS-G.RAN/WG2.RL2/TSGR2.95bis/Docs/R2-166904.zip], and NPL-21[Ericsson et al.: "Reset procedure for RLC" 3GPP TSG-RAN WG2 #60bis, R2-080234, 14 November 2007; http://www.3gpp.org/ftp/tsg.ran/wg2.rl2/TSGR2.60bis/Docs/R2-080234.zip].

SUMMARY

According to an aspect of the embodiments, a first wireless communication apparatus includes: a controller configured to perform numbering of multiple pieces of data and transmit the multiple pieces of data that are numbered, to a second wireless communication apparatus, and perform first processing in a case where, among the multiple pieces of data, specific data is discarded after the numbering and before the transmission, wherein the first processing is configured to transmit the multiple pieces of data subsequent to the discarding to the second wireless communication apparatus without renumbering, and transmit discarding notification information that notifies the discarding, to the second wireless communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A and 7B are diagram each illustrating an example of discarding notification information according to a third embodiment;

FIGS. 16A and 16B are diagrams illustrating an example of a data flow for a sublayer of the second layer in a transmission apparatus in a wireless communication system according to an eighth embodiment;

FIGS. 17A, 17B and 17C are diagrams illustrating an example of a data flow for a MAC-PDU in the transmission apparatus in the wireless communication system according to the eight ninth embodiment;

FIGS. 19A and 19B are diagrams illustrating an example of a data flow (subsequent to the discarding processing) for the sublayer of the second layer in the transmission apparatus in a wireless communication system according to the ninth embodiment;

DESCRIPTION OF EMBODIMENTS

A discussion on the 5th generation mobile communication system described above has just been started, and it is considered that for the time being, a discussion is going to be focused on a basic system design. For this reason, a sufficient study has not been made on technologies that are to be suitably mounted on the operator side. For example, the situation is that an in-depth study has not been made on transmission and reception processing which is desirable in a case where processing relating to data concatenation from an RCL layer of a transmission apparatus is removed for Ultra-Reliable and Low-latency Communications.

An object of the technology in the disclosure, which is made in view of the situation described above, is to provide a wireless communication apparatus, a wireless communication system, and a wireless communication method that perform transmission and reception processing that is desirable in the case where the processing relating to the data concatenation from the RCL layer of the transmission apparatus is removed for the Ultra-Reliable and Low-latency Communications.

A mode for practicing the present disclosure (hereinafter referred to an embodiment or an implementation example) will be described below with reference to the drawings. A configuration of the embodiment that will be described below is an example for rendering the technology of the idea behind the present disclosure into a reality, without any intention to limit the present disclosure to the configuration of the embodiment. The same applies equally to any other embodiments that are claimed in claims. For example, it is also considered that names of various layers, such as PDCP, RLC, and MAC, can be changed during a discussion on creation of specifications for the fifth generation mobile communication. In the following description, as examples of a layer in a protocol stack for wireless communication, names of layers, such as PDCP, RLC, and MAC, are used, but it is desirably noted that this is not intended to impose any limitation to these layers.

Problem Identification

First, identification of problems in the related art is described before proceeding with a description of each embodiment. The problems were newly found as a result of the inventor's detailed study in the related art, and it is desirably noted that the problem had not been known before that.

Figure 1:
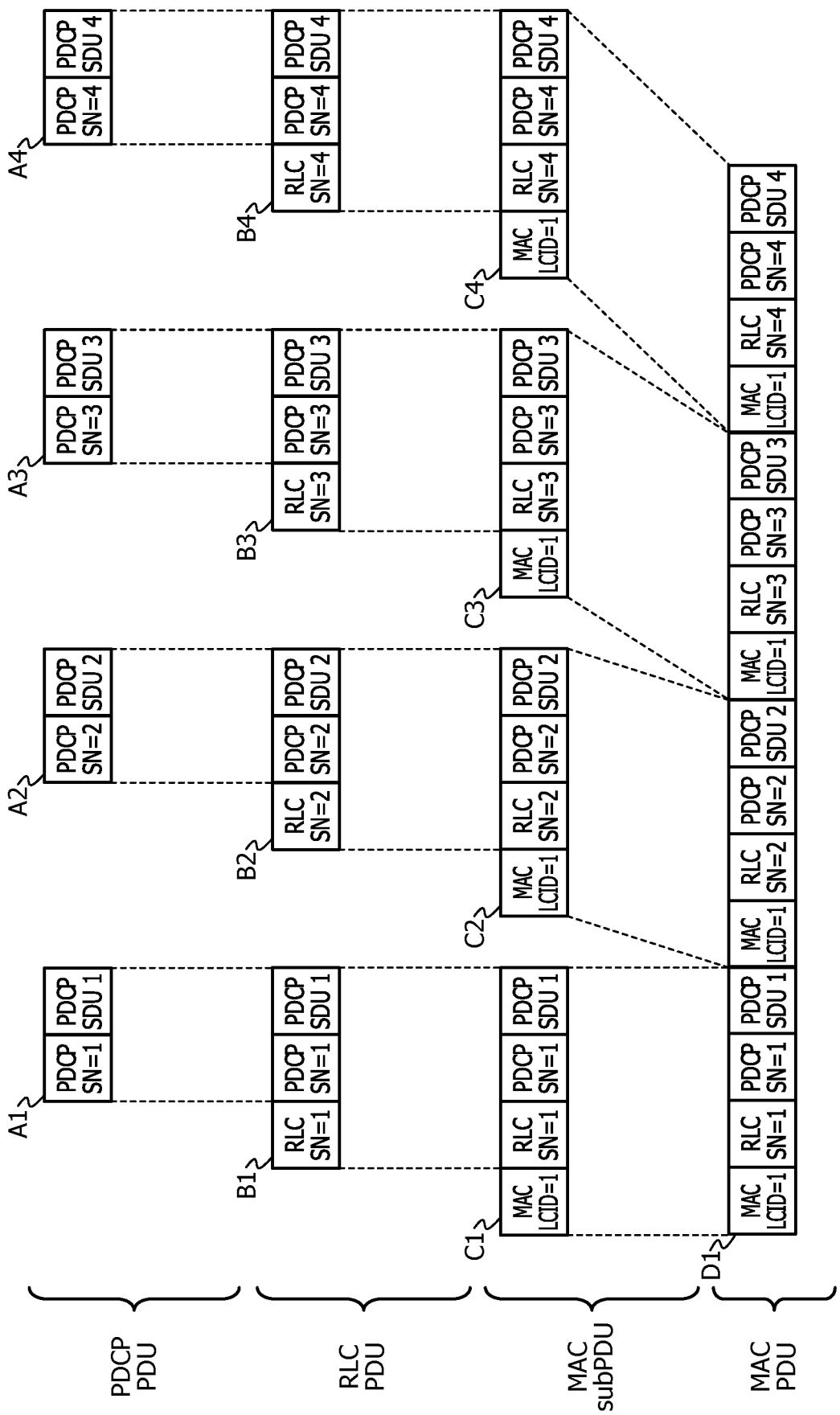
FIG. 1 is a diagram illustrating a data flow for a sublayer of the second layer a transmission apparatus in a wireless communication system that is assumed for each embodiment.

FIG. 1 is a diagram illustrating a data flow for a sublayer of the second layer in a wireless communication system that is assumed for each embodiment in the present application. The data flow in FIG. 1 illustrates a flow of data from a PDCP layer to a MAC layer in a transmission apparatus in a 5G system. It is noted that as the transmission apparatus here, a wireless base station is assumed in principle, but that in a case where the transmission apparatus is a wireless terminal, the disclosure in the present application is also fundamentally available for application. In a case where the transmission apparatus is the wireless base station, a reception apparatus is a wireless terminal, and data communication for downlink is a target for the wireless terminal. On the other hand, in a case where the transmission apparatus is a wireless terminal, the reception apparatus is a wireless base station, and data communication for uplink is a target for the wireless base station.

As directed above, in a working group (TSG-RAN WG2) for the creation of the specifications for the 5G system, a study is made on omission of processing relating the data concatenation in the RLC layer. The data flow in that is illustrated in FIG. 1 is an example that is based on a tendency of a discussion for the creation of the specifications for the 5G system, and processing that concatenates multiple PDCP-PDUs (RLC-SDUs) in the RLC layer to one RLC-PDU is not performed.

In the data flow that is illustrated in FIG. 1, each of A1 to A4 indicates the PDCP-PDU. The PDCP layer adds a PDCP header to the front of a PDCP-SDU that is received from a higher layer, and thus generates the PDCP-PDU. In the PDCP layer, numbering is performed on the PDCP-PDU. A sequence number (SN) that is a serial number in the PDCP layer is stored in the PDCP header. It is noted that the PDCP layer may be rephrased as a PDCP entity.

In FIG. 1, as one example, PDCP headers that have sequence numbers 1 to 4 are added to PDCP-PDUs 1 to 4, respectively, and thus four PDCP-PDUs, PDCP-PDUs A1 to A4 are generated. With the sequence number in the PDCP layer, it is possible that the reception apparatus, for example, rearranges (reorders) the PDCP-PDUs in correct sequential order and performs operations such as detection of double reception of the PDCP-PDU.

It is noted that it is assumed that the PDCP-PDUs A1 to A4 are PDUs, a logical channel identifier (LCID) of each of which is LCID=1. At this point, the sequence number in the PDCP layer is managed for every logical channel. That is, the sequence number is independent among multiple LCIDs. For brief description, a case where there is one logical channel will be described below, but, in a case where there are multiple logical channels, it goes without saying that each embodiment in the present application is also available for application in the same manner.

Next, in FIG. 1, each of B1 to B4 denotes the RLC-PDU. A1 to A4 are handled as PDUs (that is, PDCP-PDUs) in the PDCP layer, but it is desirably noted that these are handled as SDUs (that is, RLC-SDUs) in the RLC layer. It is noted that the RLC layer may be rephrased as an RLC entity. The RLC layer adds a RLC header to the front of each of the PDCP-PDUs A1 to A4 that are received from the PDCP layer, and thus generates RLC-PDUs B1 to B4. In the RLC layer, numbering is performed on the RLC-PDU, and a sequence number (SN) that is a serial number in the RLC layer is assigned to the RLC header.

In FIG. 1, as an example, the RLC headers that have sequence numbers 1 to 4 are added to the PDCP-PDUs A1 to A4, respectively, and thus four RLC-PDUs, the RLC-PDUs B1 to B4 are generated. With the sequence number in the RLC layer, it is possible that the reception apparatus, for example, rearranges (reorders) the RLC-PDUs in correct sequential order and performs operations such as detection of the RLC-PDU that is missing during wireless communication.

It is noted that in the same manner as the sequence number in the PDCP layer, the sequence number in the RLC layer is also managed for every logical channel. Furthermore, it is desirably noted that the sequence number in the PDCP layer is independent of the sequence number in the RLC layer. That is, in FIG. 1, the sequence number in the PDCP layer of the RLC-PDU and the sequence number in the RLC layer are lined up, and this is only for simplification of description. For example, in cases such as a case where, with a division function that has the RLC layer, one PDCP-PDU are divided into multiple ones, a discrepancy occurs between the sequence number in the PDCP layer and the sequence number in the RLC layer.

Next, in FIG. 1, each of C1 to C4 denotes a MAC-subPDU. B1 to B4 are handled as PDUs (that is, RLC-PDUs) in the RLC layer, but these are handled as SDUs (that is, MAC-SDUs) in the MAC layer. It is noted that the MAC layer may be rephrased as a MAC entity. The MAC layer adds a MAC subheader to the front of each of the RLC-PDUs B1 to B4 that are received from the RLC layer. It is assumed that the MAC-SDU to which that MAC subheader is assigned is referred to as "MAC-subPDU" for convenience. The LCID that is the logical channel is stored in the MAC subheader. As described above, the PDCP-PDUs A1 to A4 are PDUs that have LCID=1, and therefore, the LCID in the MAC subheader in each of the MAC-subPDUs C1 to C4 is set to 1. The MAC layer temporarily stores the generated MAC-subPDUs C1 to C4 in a memory.

At this point, in a transmission apparatus in a 4G system, as described above, the data concatenating processing in the RLC layer can be performed, and therefore, with scheduling, it is determined whether or not the concatenating processing is desirable. For this reason, in the transmission apparatus in the 4G system, it can take a certain amount of time to generate the RLC-PDU after receiving the PDCP-SDU from a higher layer. In contrast to this, in the transmission apparatus in the 5G system, as described above, the data concatenating processing in the RLC layer is not performed. For this reason, in the transmission apparatus in the 5G system, the RLC-PDU is promptly generated based on the PDCP-SDU that is received from the higher layer.

Accordingly, in the transmission apparatus in the 5G system, when receiving data (the PDCP-SDU) from the higher layer, it is possible that processing operations in each layer up to and including generating and storing of the MAC-subPDUs C1 to C4. These processing operations are performed without waiting for allocation of a radio resource for transmitting data, and, in some cases, are referred to as preprocessing operations. Then, when the radio resource is allocated from a scheduler, the MAC layer performs concatenating of the MAC-subPDU that is stored, and thus generates one MAC-PDU D1. It is noted that, in a case where multiple logical channels are present, the MAC-subPDU that is generated in the multiple logical channels is also linked and thus one MAC-PDU is generated. Lastly, in order to transmit a MAC-PDU using the allocated radio resource, the MAC layer transfers (delivers) the MAC-PDU to a physical layer.

In the 5G system, because the preprocessing operations up to and including the generating of the MAC-subPDU are performed in advance, not only the processing that generates the MAC-PDU when the resource is allocated can be simplified, but latency in processing can also be shortened that much. Accordingly, it is possible that a requirement for ultra-low latency in the 5G system is satisfied.

It is noted that in the generating of the MAC-PDU D1 that is illustrated in FIG. 1, an information element, which is referred to as a MAC-Control Element (CE) such as a Timing Advance Command (TAC). Furthermore, the data structure of the MAC-PDU is not limited to an example that is illustrated in FIG. 1. For example, an arrangement of the MAC-SDU and the MAC subheader is made differently than an example of an arrangement that is illustrated in FIG. 1. As one example, the MAC subheader of each MAC-subPDU is collectively positioned in the front of the MAC-PDU, and the MAC-SDU can be subsequently positioned in order of alignment with the MAC subheader.

Then, in the transmission apparatus in the 4G system, in some cases, data (the PDCP-PDU) that is stored temporarily is discarded. This discarding is performed after a prescribed timer expires in the PDCP layer, and this is performed for the purpose of control of retention time. Because it is assumed that the same function of discarding data as in the 4G system is stipulated in the 5G system, the inventor in the present application independently considered data discarding in 5G. The consideration made by the inventor will be described below.

Figure 2:
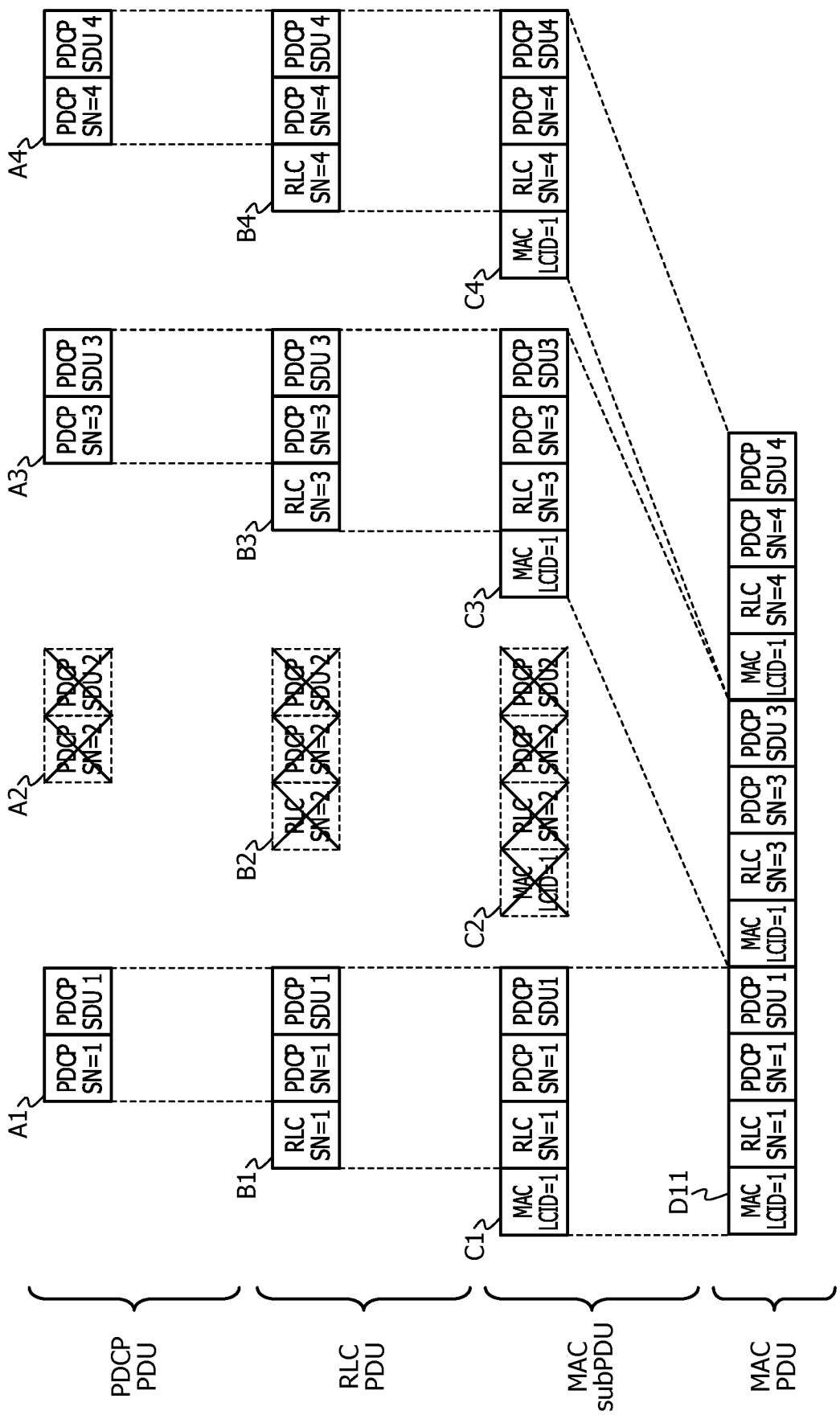
FIG. 2 is a diagram illustrating an example of a case where a portion of data is set to be a target to be discarded, in the data flow for the sublayer of the second layer in the transmission apparatus in the wireless communication system that is assumed for each embodiment.

FIG. 2 is a diagram illustrating an example of a case where a portion of data is set to be a target to be discarded, in the data flow in FIG. 1. In an example that is illustrated in FIG. 2, an example of the data flow in a case where a PDCP-PDU A2 is set to be a target to be discarded after being transferred to the MAC layer through the RLC layer is illustrated. It is noted that FIG. 2 illustrates a case where, among multiple PDCP-PDUs, the PDCP-PDUs A1 to A4, one PDCP-PDU, the PDCP-PDU A1, is discarded, and that it is considered that the same is also true in a case where multiple PDCP-PDUs are discarded.

In FIG. 2, regarding the PDCP-PDU A2, the data flow up to and including a point in time where a MAC-subPDU C2 is stored in a buffer is the same as in the example that is illustrated in FIG. 2. However, in the example in FIG. 2, at a point in time that is earlier than a point in time when the MAC-subPDU that is equivalent to the PDCP-PDU A2 is acquired from the buffer according to a resource being allocated, for example, the higher layer such as the PDCP layer notifies the MAC layer of an instruction for discarding the PDCP-PDU A2 that is a target. The MAC layer can receive the instruction for discarding from the higher layer, through the RLC layer.

In the example that is illustrated in FIG. 2, an operation that is performed after receiving the instruction for discarding from the higher layer, the MAC layer excludes the MAC-subPDU C2 that corresponds to the PDCP-PDU A2 that is the target to be discarded, concatenates the other MAC-subPDUs C1, C3, and C4, and thus generates a MAC-PDU D11. Accordingly, the PDCP-PDU A2 that is the target to be discarded is not transmitted from the transmission apparatus to the reception apparatus, and thus consumption of the radio source can be suppressed.

Incidentally, an aspect of the example that is illustrated in FIG. 2 is that, before and after data that is the target to be discarded, a missing number (number omission) occurs among the sequence numbers (SNs). For example, in FIG. 2, because the PDCP-PDU A2 is discarded, a sequence number 2 is a missing number in the PDCP layer. Furthermore, in FIG. 2, because an RLC-PDU B2 that corresponds to the PDCP-PDU A2 is discarded, a sequence number 2 is also a missing number in the RLC layer.

In a case where that missing number occurs among the sequence numbers, on the receiving side, it is difficult to distinguish whether data that corresponds to the missing number is accidentally defective (a so-called transmission error) over a wireless network, or the data is intendedly discarded within the transmission apparatus. Accordingly, on the receiving side, reordering processing that correctly rearranges pieces of data based on the sequence numbers occurs in a useless manner. That useless reordering is a cause of latency in communication, and because of this, is desirably avoided ahead of time.

In the 4G system described above, a problem of the useless reordering is solved by reassigning the sequence numbers (renumbering). For example, after PDCP-PDUs having sequence numbers 1 to 3 are generated, in a case where the PDCP-PDU having the sequence number 2 is discarded, the sequence number in the third PDCP-PDU is changed from 3 to 2. Accordingly, in the 4G system, the missing number, among the sequence numbers, is changed, and as a result, the useless reordering can be avoided ahead of time.

However, when taking into account requirements for the 5G system, it is considered that the reassigning the sequence numbers (renumbering) is not realistic. That is, in a case where the reassigning of the sequence numbers are performed, because regeneration of the MAC-subPDU that is temporarily generated by the preprocessing is desirable, it is expected that a certain amount of latency occurs. At this point, as described above, Ultra-Reliable and Low-latency communications are given, as a basic functional requirement, in the 5G system, and therefore, latency that accompanies the reassigning of the sequence numbers can be a major obstacle to realization of the requirement. Therefore, it is considered that it is realistically difficult to perform the reassigning of the sequence numbers in the 5G system.

In summary, in the transmission apparatus in the 5G system, data is discarded after the preprocessing, and thus, the useless reordering processing that accompanies the missing number among the sequence numbers occurs on the receiving side. As one proposal for dealing with this inconvenience, it is also considered that the sequence numbers are reassigned (renumbering) in the transmission apparatus, but this is an obstacle to the low-latency communication that is desirable for the 5G system. Thus, it is not realistic to perform the reassigning. As described above, this knowledge was obtained by the inventor's own consideration.

It is noted that the above description is provided based on the 5G system, but that, as an additional remark, if a prescribed condition is set up, this description applies to other wireless communication systems.

Embodiments for solving this problem will be sequentially described below.

First Embodiment

According to a first embodiment, there is provided a wireless communication apparatus (for example, a wireless base station) that performs numbering (for example, assigning of sequence numbers in a PDCP layer or a RLC layer to) of multiple pieces of data (for example, multiple PDCP-PDUs or RLC-PDUs) and transmits the multiple pieces of data that are numbered, to any other wireless communication apparatus (for example, a wireless terminal), the wireless communication apparatus includes a control unit that not only transmits the multiple pieces of past-discarding data to the other wireless communication apparatus without renumbering of the multiple pieces of past-discarding data, but also transmits discarding notification information that notifies the discarding, to the other wireless communication apparatus, in a case where, among the multiple pieces of data, specific data is discarded after the numbering and before the transmission.

The technological significance of the first embodiment is described. As described above, for example, in the 5G system, in the transmission apparatus (that corresponds to the wireless communication apparatus described above) that performs the numbering of the multiple pieces of data, and transmits the multiple pieces of data that are numbered, to the reception apparatus (that corresponds to the other wireless communication apparatus described above), in the case where, among the multiple pieces of data, the specific data is discarded after the numbering and before the transmission, a missing number among sequence numbers occurs, and reordering processing (correct rearranging of pieces of data based on sequence numbers) of the multiple pieces of data in the reception apparatus occurs in a useless manner. As a result, latency in communication can be caused. There is also an aspect in which the transmission apparatus performs the renumbering (reassigning the sequence numbers) and in which this inconvenience can thus be solved to some extent. However, the renumbering in the transmission apparatus is accompanied by fixed latency in processing. Because of this, it is not realistic to perform the renumbering in the wireless communication system (for example, the 5G system), for which the low latency is desirable.

Accordingly, in the first embodiment, in a case where, among the multiple pieces of data, the discarding of the specific data occurs, it is assumed that removal of the inconvenience relating to the reordering processing by the reception apparatus is achieved without performing the reassigning of the sequence number on the pieces of data subsequent to the discarding.

Figure 3:
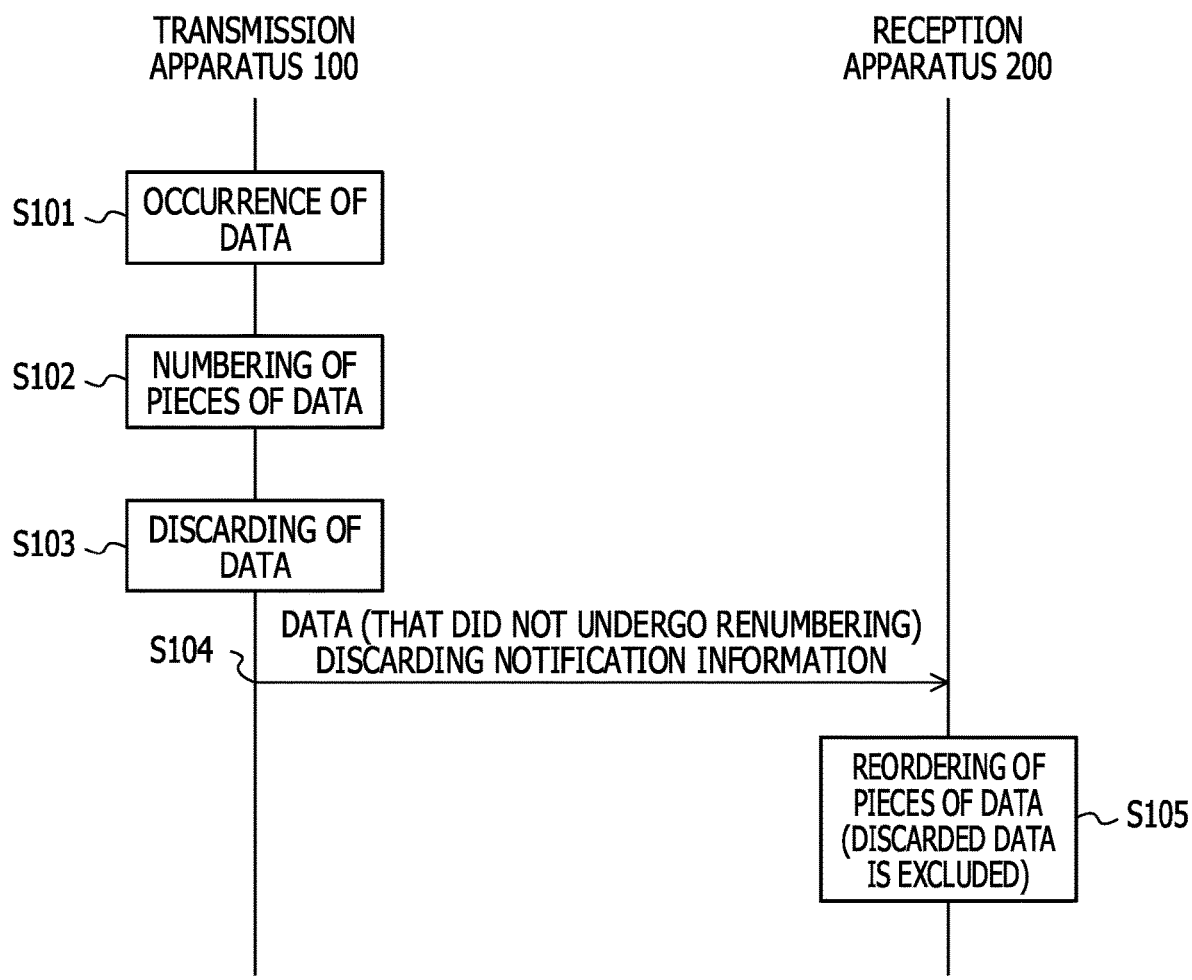
FIG. 3 is a diagram illustrating an example of a processing sequence according to a first embodiment.

Specifically, as illustrated in FIG. 3, a transmission apparatus 100 according to the first embodiment generates multiple pieces of data (S101), and performs numbering on the multiple pieces of generated data (S102). Thereafter, in a case where discarding of specific data occurs (S103), the transmission apparatus 100 also transmits the multiple pieces of data subsequent to the discarding to a reception apparatus 200 without renumbering (S104). That is, the transmission apparatus 100 transmits the multiple pieces of data that do not include the discarded specific data, to the reception apparatus 200, without changing the missing number in the numbering that occurs due to the discarding of the specific data.

Moreover, the transmission apparatus 100 according to the first embodiment transmits the discarding notification information that notifies the discarding of the specific data, to the reception apparatus 200 (S104). At this time, the discarding notification information may be transmitted to the reception apparatus 200 using an in-band (using a data bear). In contrast to this, based on the discarding notification information, the reception apparatus 200 according to the first embodiment causes the multiple pieces of data, which are targets for the reordering processing, not to include the specific data (S105). That is, the reception apparatus 200 skips the reordering processing on the specific data.

The first embodiment employs the configuration described above, and thus, in a case where the discarding of the data occurs, the reassigning of the sequence numbers (renumbering) does not also have to be performed in the transmission apparatus 100. For this reason, the latency in processing that accompanies the reassigning of the sequence numbers can be avoided. On the other hand, with the discarding notification information, the discarding of the data in the transmission apparatus 100 can be recognized in the reception apparatus 200. For this reason, the reception apparatus 200 can cause the targets for the reordering not to include the data that is discarded in the transmission apparatus 100, and thus, it is possible that the occurrence of the useless reordering is avoided.

Therefore, according to the first embodiment described above, in a case where, among the multiple pieces of data, the discarding occurs, the imperfection relating to the reordering processing by the reception apparatus 200 can be corrected without performing the reassigning of the sequence number on the pieces of past-discarding data. Accordingly, according to the first embodiment, it is possible that Ultra-Reliable and Low-latency Communications are realized and that the problem that can correspondingly occur is solved.

Second Embodiment

A second embodiment is an example of an embodiment that results from the disclosure in the present application finding application in the 5G system.

A basic processing flow and the like in the second embodiment are the same as those in the first embodiment. Thus, in the following, what distinguishes the second embodiment from the first embodiment described above is described in detail in a focused manner.

Figure 4:
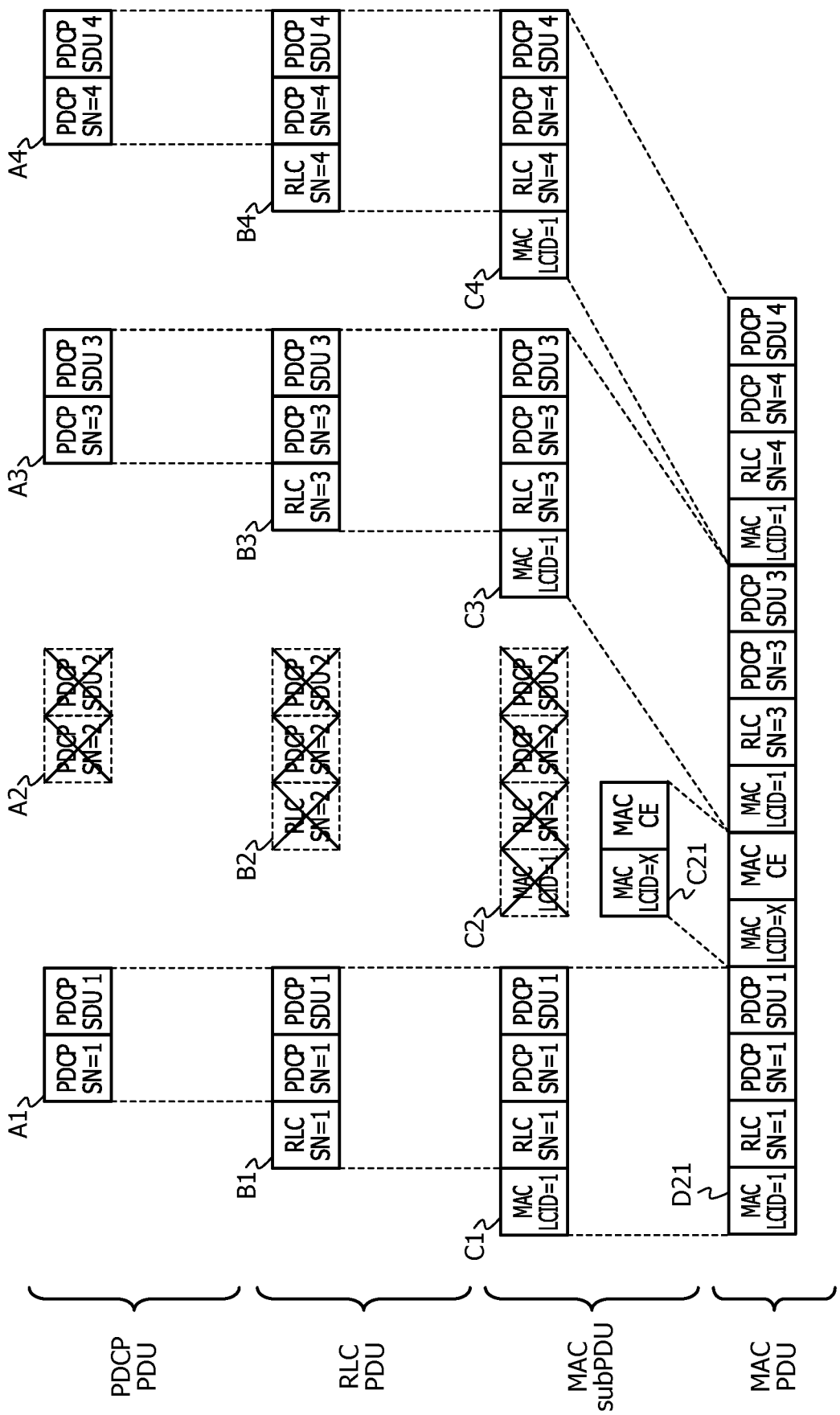
FIG. 4 illustrates an example of a data flow for a sublayer of the second layer a transmission apparatus in a wireless communication system according to a second embodiment.

FIG. 4 illustrates an example of a data flow for a sublayer of the second layer in a transmission apparatus 100 in a wireless communication system according to the second embodiment. It is noted that FIG. 4 presupposes FIGS. 1 and 2 and other figures and that these figures are referred to for description where relevant.

In FIG. 4, as in FIG. 2, an example of a data flow in a case where the PDCP-PDU A2 is set to be a target to be discarded after being transferred to the MAC layer through the RLC layer is illustrated. At this time, in the same manner as in the first embodiment, the transmission apparatus 100 according to the second embodiment notifies the reception apparatus 200 of the discarding notification information (that is, the discarding notification information that possibly specifies the discarded data) indicating that the data is discarded.

In the second embodiment, as the discarding notification information, a MAC control element (CE) is used. As illustrated in FIG. 4, the MAC layer that is notified that the PDCP-PDU A2 is discarded not only generates the MAC CE, but also adds the MAC subheader to the MAC CE, thereby generating a MAC-subPDU C21.

At this point, as described above, a 5-bit LCID is set for the MAC subheader. The LCID, as described above, denotes an identifier of the logical channel to which data normally belongs, and a value that is stipulated in advance for every type of MAC CE is set for the LCID in a MAC-header that is added to the MAC CE. For example, in the 4G system as of the present application filing data, LCIDs for the MAC CE, 11000 to 11110 had been already used, and 01011 to 10111 had been reserved values. Therefore, as an example, a maximum value among the reserved values can be employed for the MAC CE that is the discarding notification information in the second embodiment, and LCID=10111 can be used (it is noted that, depending on the situation of the paper sheet on which the figure is drawn, it is assumed that in FIG. 4, LCID=X) (the same is also true for the other figures).

Figure 5A:
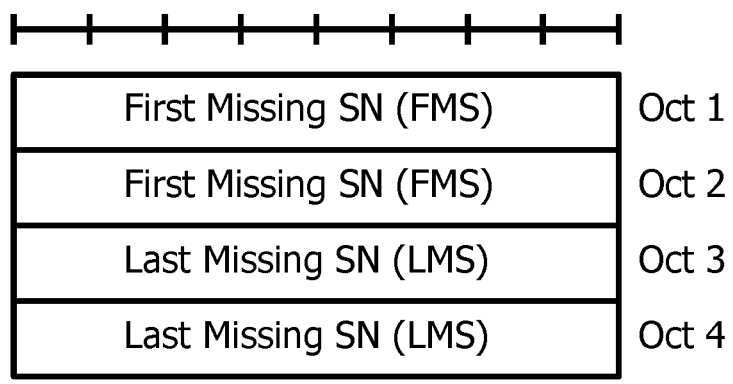
FIGS. 5A and 5B are diagrams each illustrating an example of discarding notification information according to the second embodiment.
Figure 5B:
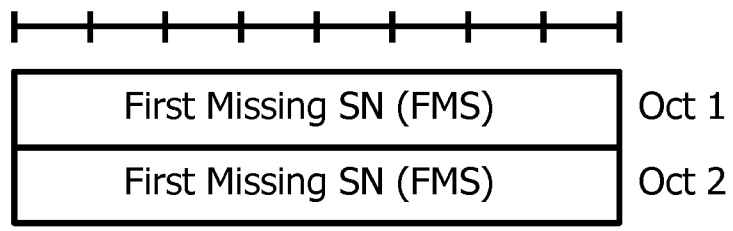

FIG. 5B illustrates an example of a MAC CE that is discarding notification information according to the second embodiment. The MAC CE that is illustrated in FIG. 5B may be rephrased as 2-octet (which may be rephrased as 2 bytes) (the same is hereinafter true) information, and these 2 octets are set to be in a field, such as a first missing SN (FMS).

The sequence number in the RLC layer, of the discarded data is set to be in the FMS that is illustrated in FIG. 5B. Because a size of the sequence number in the RLC layer is 2 octets long, to conform with this, a size of the FMS in FIG. 5B is also 2 octets long. For example, in FIG. 4, as an example, because data having a sequence number 2, in the RLC layer is discarded, 2 (which, when expressed in a 2-octet format, is 0000000000000010) is set to be in the FMS in this case. With the discarding notification information that is illustrated in FIG. 5B, discarding of one RLC PDU can be dealt with. The discarding notification information that is illustrated in FIG. 5B may be referred to as "short (type)" for convenience.

Figure 6:
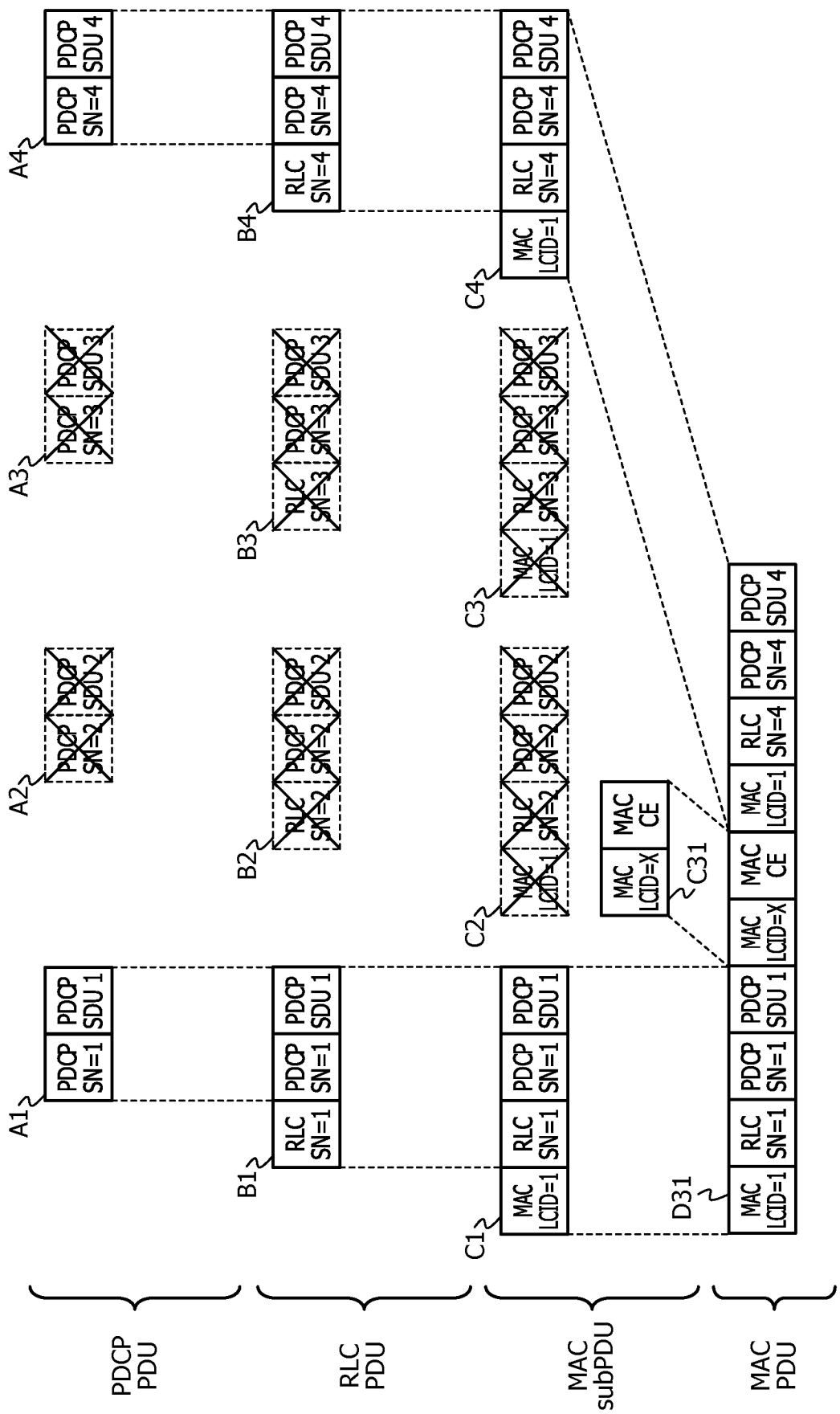
FIG. 6 is a diagram illustrating another example of the data flow for the sublayer of the second layer in the transmission apparatus in the wireless communication system according to the second embodiment.

Then, before a description is provided with reference to FIG. 5A, another example of the data flow for the sublayer that is the second layer in the transmission apparatus 100 in the wireless communication system according to the second embodiment is described with reference to FIG. 6. In FIG. 6, unlike in FIG. 4, an example of the data flow in a case where multiple contiguous PDCP-PDUs, PDCP-PDUs A2 and A3, are set to be targets to be discarded after being transferred to the MAC layer through the RLC layer is illustrated.

FIG. 5A illustrates another example of the MAC CE that is the discarding notification information according to the second embodiment. The MAC CE that is illustrated in FIG. 5A is 4-octet information, the former half 2 octets are set to be in the FMSs, respectively, and the latter half 2 octets are stored in fields, respectively, such as last missing SNs (LMSs).

The initial sequence number in the RLC layer, of sequence numbers of multiple pieces of discarded data is set to be in the FMS that is illustrated in FIG. 5A. Furthermore, the last sequence number in the RLC layer, of the sequence numbers of the multiple pieces of discarded data is set to be in the LMS. For example, in FIG. 6, as an example, because pieces of data having sequence numbers 2 and 3 in the RLC layer are discarded, 2 (which, when expressed in a 2-octet format, is 0000000000000010) is set to be in the FMS in this case, and 3 (which, when expressed in a 2-octet format, is 0000000000000011) is set to be in the LMS. With the discarding notification information that is illustrated in FIG. 5A, the discarding of the multiple contiguous RLC PDUs can be dealt with. The discarding notification information that is illustrated in FIG. 5A may be referred to "long (type)" for convenience.

In the wireless communication system according to the second embodiment can suitably use short-type discarding notification information and long-type discarding notification information that are illustrated in FIGS. 5A and 5B, respectively. At this point, for example, switching between the short-type discarding notification information and the long-type discarding notification information can be performed using an L field in the MAC subheader. The L fielder of the MAC subheader is a field indicating a size (on a per-octet basis) of the MAC-SDU or the MAC CE to which the subheader is added. Accordingly, by setting values of the L field to 2 and 4, the short type and the long type, respectively, can be specified.

When generating a MAC-subPDU C21 that is based on the MAC CE which is the discarding notification information, the MAC layer of the transmission apparatus 100, as illustrated in FIG. 4, concatenates this to any other MAC-subPDUs C1, C3, and C4, and generates one MAC-PDU D21. In this concatenation, in FIG. 4, as an example, the MAC-subPDU is concatenated to C1, C21, C3, C4 in this order. However, this is only an example, and for example, it is also possible that the MAC CE C21 that corresponds to the discarding notification information is added in the front and that the MAC-subPDU is concatenated to C21, C1, C3, C4 in this order. It is noted that a description with reference to FIG. 6 is the same as that with reference to FIG. 4 and thus is omitted here.

It is desirably noted that as in the first embodiment, in a case where the discarding of the data occurs, it is also assumed that the transmission apparatus 100 according to the second embodiment does not perform the reassigning of the sequence numbers (renumbering). For example, in FIG. 4, the PDCP-PDU A2 is discarded, but the reassigning of the sequence numbers in the PDCP layer or the RLC layer is not performed. Accordingly, the missing number occurs among the sequence numbers in the PDCP layer or the RLC layer. Thus, the transmission apparatus 100 according to the second embodiment transmits the discarding notification information, as described above, to the reception apparatus 200. Accordingly, it is possible that the reception apparatus 200 according to the second embodiment explicitly recognizes that the missing number among the sequence number of pieces of data is based on the discarding of the data in the transmission apparatus 100. Accordingly, useless reordering in the RLC layer or the PDCP layer in the reception apparatus 200 can be avoided. The same operational advantage as this can also be described in each of the following embodiments.

According to the second embodiment described above, in the same manner as in the first embodiment, in the case where, among the multiple pieces of data, the discarding occurs, the imperfection relating to the reordering processing by the reception apparatus 200 can be corrected without performing the reassigning of the sequence number on the pieces of past-discarding data. Accordingly, according to the second embodiment, it is possible that the Ultra-Reliable and Low-latency Communications are realized and that the problem which can correspondingly occur is solved.

Third Embodiment

A third embodiment is also an example of the embodiment that results from the disclosure in the present application finding application in the 5G system.

A basic processing flow and the like in the third embodiment are the same as those in the first and second embodiments. Thus, in the following, what distinguishes the third embodiment from the first and second embodiments is described in detail in a focused manner.

In the third embodiment, in the same manner as in the second embodiment, as the discarding notification information, the MAC CE is used. FIG. 7A illustrates an example of a MAC CE that is discarding notification information according to the third embodiment.

The MAC CE that is illustrated in FIG. 7A is similar to the MAC CE that is illustrated in FIG. 5A, and includes the FMS and the LMS. However, whereas the FMS or the LMS that is illustrated in FIG. 5A is 16 bits (2 octets) long, the FMS or the LMS that is illustrated in FIG. 7A is 15 bits long. This is because it is assumed that, in the FMS or the LMS in FIG. 7A, the sequence number in the PDCP layer is stored instead of the sequence number in the RLC layer. Because a size of the sequence number in the PDCP layer is 15 bits long at the maximum, to conform with this, a size of the FMS or the LMS in FIG. 7A is also set to be 15 bits long. It is noted that in FIG. 7A, the first bit R in the first octet and the third octet indicate a reserved field.

With the MAC CE in FIG. 7A, a contiguous discarded-data group (discarded PDCP-PDU group) can be specified by the FMS and LMS. However, values of the FMS and the LMS are set to be the same, and thus the discarding of a single piece of data can also be dealt with.

Next, FIG. 7B illustrates another example of the MAC CE that is the discarding notification information according to the third embodiment. The MAC CE in FIG. 7B is equivalent to a modification example of the MAC CE in FIG. 7A.

The MAC CE that is illustrated in FIG. 7B is similar to the MAC CE that is illustrated in FIG. 7A, but the first bit in the third octet is an E field instead of the reserved field R. At this point, it is assumed that, for example, a value of the E field is set to 0 and thus that the latter half 2 octets of the MAC CE can be invalidated. That is, in a case where values of the FMS and the LMS are different from each other, not only are these values set, but a value of the E field is also set to 1. In contrast to this, in a case where the FMS and the LMS have the same value, not only is this value set for the FMS, but the value of E field is also set to 0. Accordingly, regarding the discarding of a single piece of data, the size of the discarding notification information can be decreased.

When receiving the discarding notification information, the MAC layer of the reception apparatus 200 can deliver the discarding notification information, as described above, to the RLC layer. Then, the RLC layer delivers the discarding notification information to the PDCP layer. Then, when receiving the discarding notification information, the PDCP layer performs control in such a manner that the reordering is not performed on the PDCP PDU. It is noted that in order for the discarding notification information to be suitably forwarded to the PDCP layer, for the RLC layer, it is desirable that the discarding notification information is handled as a normal RLC PDU.

According to the third embodiment described above, in the same manner as in each of the embodiments described above, in the case where, among the multiple pieces of data, the discarding occurs, the imperfection relating to the reordering processing by the reception apparatus 200 can be corrected without performing the reassigning of the sequence number on the pieces of past-discarding data. Accordingly, according to the third embodiment, it is possible that the Ultra-Reliable and Low-latency Communications are realized and that the problem which can correspondingly occur is solved.

Fourth Embodiment

A fourth embodiment is also an example of an embodiment that results from the disclosure in the present application finding application in the 5G system.

A basic processing flow and the like in the fourth embodiment are the same as those in the first and second embodiments. Thus, in the following, what distinguishes the fourth embodiment from the first and second embodiments is described in detail in a focused manner.

Figure 8:
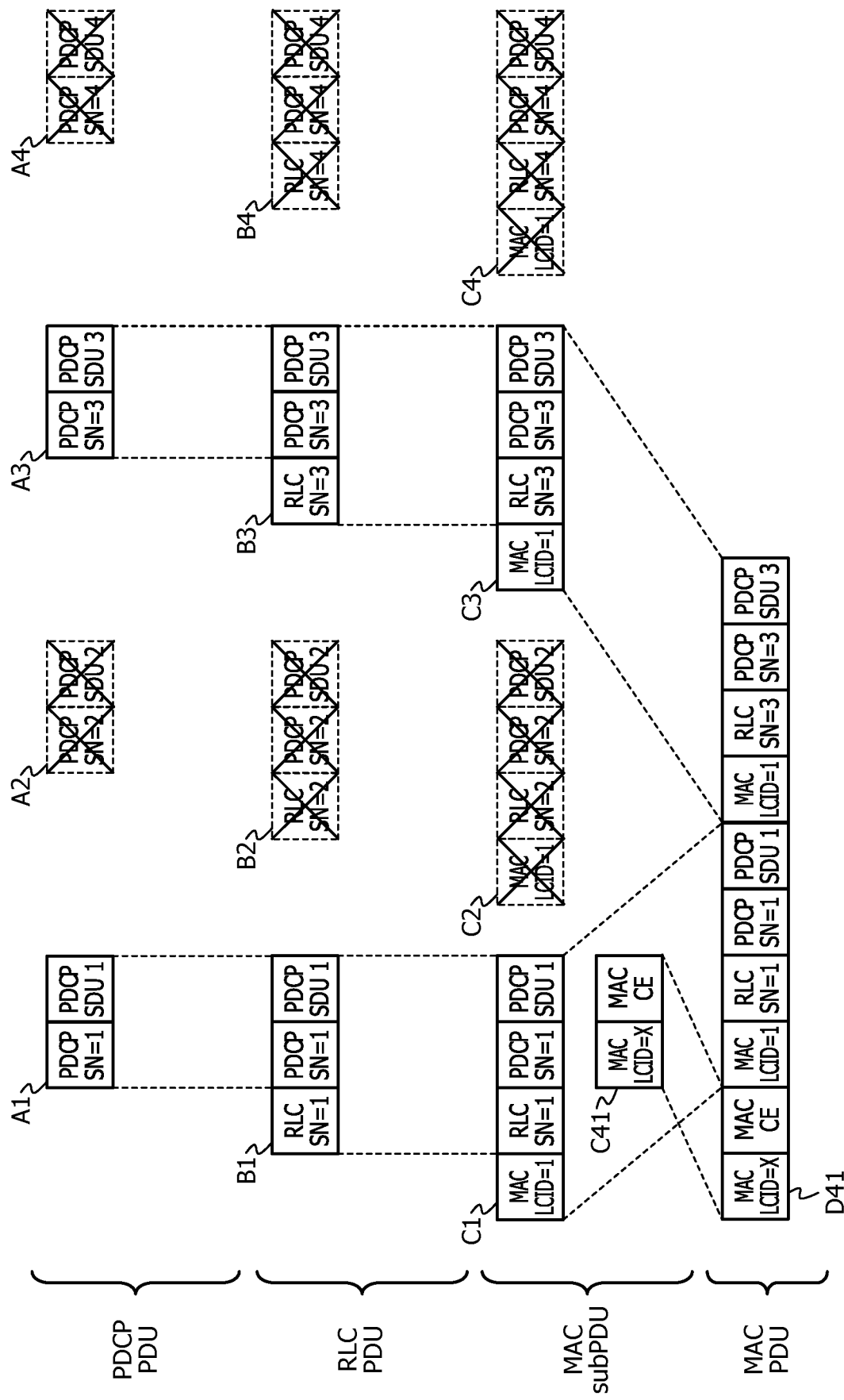
FIG. 8 is a diagram illustrating an example of a data flow for a sublayer of the second layer in a transmission apparatus in a wireless communication system according to a fourth embodiment.

FIG. 8 illustrates an example of a data flow for a sublayer of the second layer in a transmission apparatus 100 in a wireless communication system according to the fourth embodiment. It is noted that FIG. 8 presupposes FIGS. 1 and 2 and other figures and that these figures are referred to for description where relevant.

In FIG. 8, an example of a data flow in a case where two PDCP-PDUs A2 and A4 are set to be targets to be discarded after being transferred to the MAC layer through the RLC layer is illustrated. At this time, in the same manner as in the first embodiment, the transmission apparatus 100 according to the fourth embodiment notifies the reception apparatus 200 of the discarding notification information indicating that the data is discarded.

In the fourth embodiment, in the same manner as in the second and third embodiments, as the discarding notification information, the MAC CE is used. As illustrated in FIG. 8, the MAC layer that is notified that the PDCP-PDUs A2 and A4 are discarded not only generates the MAC CE, but also adds the MAC subheader to the MAC CE, thereby generating MAC-subPDU C41.

Figure 9:
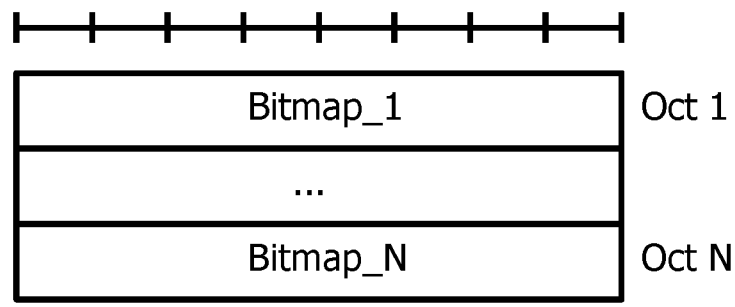
FIG. 9 is a diagram illustrating an example of discarding notification information according to a fourth embodiment.

FIG. 9 illustrates an example of a MAC CE that is discarding notification information according to the fourth embodiment. The MAC CE that is illustrated in FIG. 9 has a variable length and is N-octet information. As illustrated in FIG. 9, a bitmap is set to be in N octets. It is noted that, in the same manner as in the second embodiment, a length of the MAC CE can be specified by the L field in the MAC subheader.

With the bitmap that is illustrated in FIG. 9, for example, the discarding or non-discarding of data that corresponds to each sequence number in the RLC layer is specified. At this point, for example, "0" can be set for a bit that corresponds to the sequence number of the data that is discarded, and "1" can be set for a bit that corresponds to the sequence number of the data that is not discarded. As an example, in FIG. 4, because pieces of data having sequence numbers 2 and 4 in the RLC layer are discarded, "1010" is set to be in first four bits in the bitmap in this case (the discarding or non-discarding of pieces of data having sequence numbers 1, 2, 3, and 4 is indicated starting from the most significant bit in the bitmap). With the discarding notification information that is illustrated in FIG. 9, the discarding of non-contiguous (randomly-distributed) pieces of data can be efficiently dealt with.

When generating the MAC-subPDU C41 that is based on the MAC CE which is the discarding notification information, the MAC layer of the transmission apparatus 100 according to the fourth embodiment, as illustrated in FIG. 8, concatenates this to any other MAC-subPDCs C1, C3, and C4, and generates one MAC-PDU D41. In this concatenation, in FIG. 8, as an example, a MAC CE C41 that corresponds to the discarding notification information is added in the front, and that the MAC-subPDU C41 is concatenated to C41, C1, C3, C4 in this order. Accordingly, the reception apparatus 200 according to the fourth embodiment can initially receive the MAC CE C41 that corresponds to the discarding notification information, and because of this, it is possible that the reception apparatus 200 performs subsequent reordering processing without latency.

According to the fourth embodiment described above, in the same manner as in each of the embodiments described above, in the case where, among the multiple pieces of data, the discarding occurs, the imperfection relating to the reordering processing by the reception apparatus 200 can be corrected without performing the reassigning of the sequence number on the pieces of past-discarding data. Accordingly, according to the fourth embodiment, it is possible that the Ultra-Reliable and Low-latency Communications are realized and that the problem which can correspondingly occur is solved.

Fifth Embodiment

A fifth embodiment is also an example of an embodiment that results from the disclosure in the present application finding application in the 5G system.

First, before the fifth embodiment is described, the background and the significance of the fifth embodiment are described. In the second to fourth embodiments described above, the MAC CE that is control information on the MAC layer is used as the discarding notification information. At this point, with the discarding notification information, as described above, the discarded data is specified using the sequence number in the RLC layer or the PDCP layer.

For this reason, in the second to fourth embodiments, the MAC layer of the transmission apparatus 100 handles information (the sequence number) of the RLC layer or the PDCP layer. In this case, the MAC layer of the transmission apparatus 100 has to learn information from the RLC layer or the PDCP layer. The reason is that, If this is not done, the MAC layer had difficulty in burying the information of the RLC layer or the PDCP layer in the MAC CE. On the other hand, in the second to fourth embodiments, the MAC layer of the reception apparatus 200 also handles the information (the sequence number) of the RLC layer or the PDCP layer. In this case, the MAC layer of the reception apparatus 200 has to notify information the RLC layer or the PDCP layer. The reason is that, if this is not done, the RLC layer or the PDCP layer has difficulty in skipping the reordering based on the discarding notification information.

However, it is also thought that, according to an aspect, it is not said that these configurations, when considered based on the cross-layer design principle for standardization, are necessarily desirable. That is, according to the cross-layer design principle, each layer operates independently, but it is thought that, in the configurations described above, the independence among layers is not partly secured. Therefore, the embodiment that is based on the cross-layer design principle is also desirable.

On the other hand, according to the recent discussion on the standardization of the 5G system, the turning-on or -off of a reordering function in the RLC layer of the wireless terminal that is the reception apparatus 200 has been studied for downlink communication. At this point, it is assumed that the base station explicitly instructs the wireless terminal to perform the turning-on or -off of the reordering function in the RLC layer, for example, using RRC signaling.

At this point, in a case where the reordering function of the RLC layer is turned on, the reordering is performed in the RLC layer of the reception apparatus 200. For this reason, when the missing number occurs among the sequence numbers in the RLC layer, it is considered that the imperfection in the reordering, which is described above, occurs in the RLC layer. Moreover, the reordering is also performed in the PDCP layer of the reception apparatus 200. For this reason, when the missing number occurs among the sequence numbers in the PDCP layer, it is considered that the imperfection in the reordering, which is described above, also occurs in the PDCP layer.

In contrast to this, in a case where the reordering function of the RLC layer is turned off, the reordering is not performed in the RLC layer of the reception apparatus 200. For this reason, although the missing number occurs among the sequence numbers in the RLC layer, it is considered that a particular obstacle does not occur in the RLC layer. On the other hand, in a case where the reordering function of the RLC layer is turned off, this does not mean that even the reordering is also undesirable in the PDCP layer. For this reason, when the missing number occurs among the sequence numbers in the PDCP layer, it is considered that the imperfection in the reordering, which is described above, occurs in the PDCP layer.

Based on the above description, the discarding notification information in accordance with the cross-layer design principle, in each of the case where the reordering function of the RLC layer is turned on and the case where the reordering function of the RLC layer is turned off, will be described below as the fifth embodiment.

A basic processing flow and the like in the fifth embodiment are the same as those in the first and second embodiments. Thus, in the following, what distinguishes the fifth embodiment from the first and second embodiments is described in detail in a focused manner.

Figure 10:
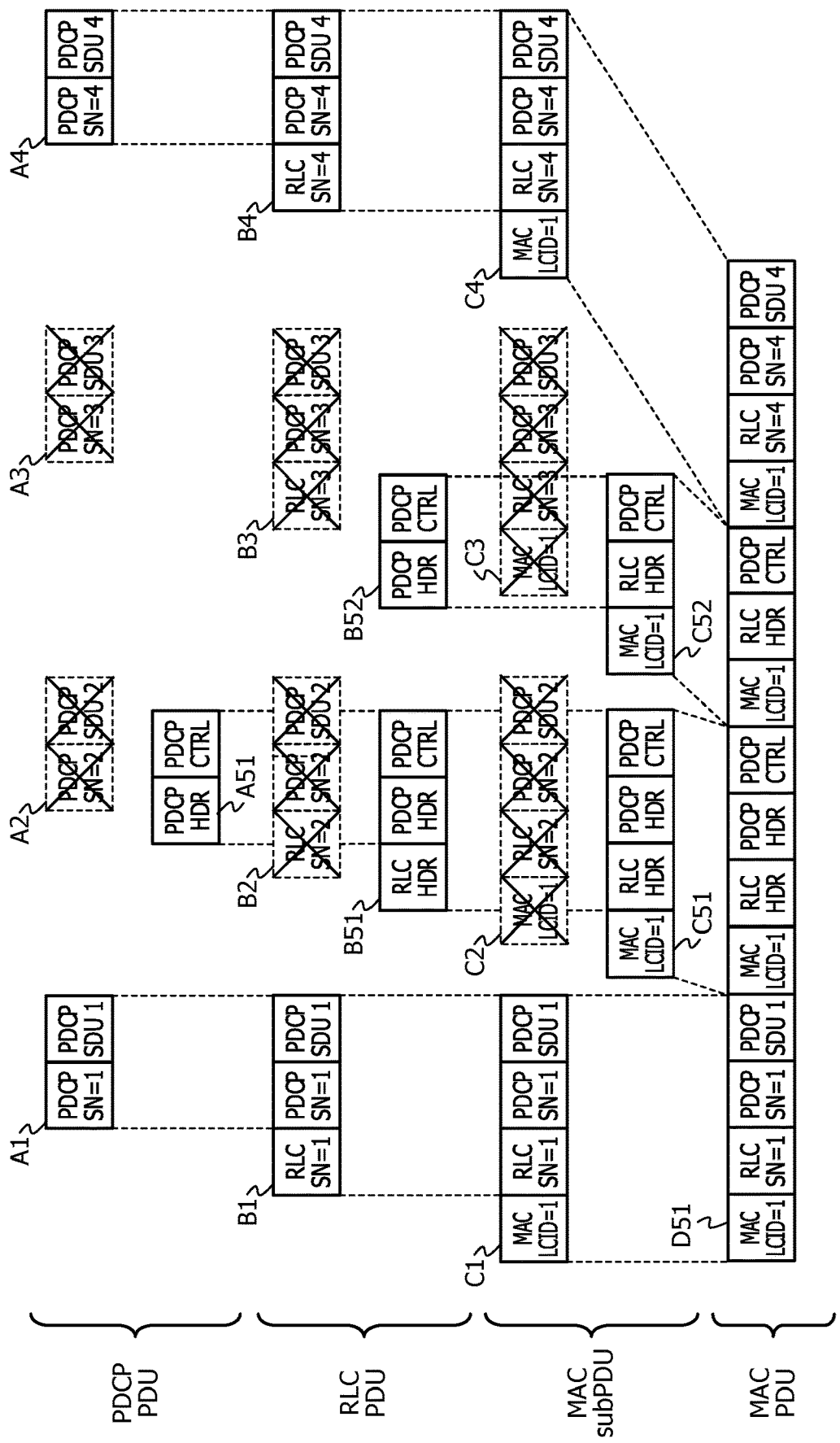
FIG. 10 is a diagram illustrating an example of a data flow for a sublayer of the second layer in a transmission apparatus in a wireless communication system according to a fifth embodiment.

FIG. 10 illustrates an example of a data flow for a sublayer of the second layer in a transmission apparatus 100 in a wireless communication system according to the fifth embodiment. FIG. 10 is equivalent to a data flow in a case where the reordering is turned on in the RLC layer described above. It is noted that FIG. 10 presupposes FIGS. 1 and 2 and other figures and that these figures are referred to for description where relevant.

In FIG. 10, an example of a data flow in a case where two PDCP-PDUs A2 and A3 are set to be targets to be discarded after being transferred to the MAC layer through the RLC layer is illustrated. At this time, in the same manner as in the first embodiment, the transmission apparatus 100 according to the fifth embodiment notifies the reception apparatus 200 of the discarding notification information indicating that the data is discarded.

In FIG. 10, unlike in the second to fourth embodiments, a control PDU in the PDCP layer and a control PDU in the RLC layer are used as the discarding notification information. As illustrated in FIG. 10, the PDCP layer of the transmission apparatus 100, which is notified that the PDCP-PDUs A2 and A3 are discarded, generates a control PDU A51 in the PDCP layer, which corresponds to first discarding notification information. In the control PDU in the PDCP layer, a header and a payload are originally integrated into one piece, but in FIG. 10, the header and the payload are expressed as "PDCP HDR" and "PDCP CTRL", respectively. A format of the control PDU A51 in the PDCP layer, which is the first discarding notification information will be described below.

In FIG. 10, the RLC layer of the transmission apparatus 100 adds the RLC header to the control PDU A51 in the PDCP layer and thus generates an RLC-PDU B51. It is noted that in FIG. 10, the RLC header is expressed as "RLC HDR". Then, the MAC layer of the transmission apparatus 100 adds the MAC subheader to the RLC-PDU B51 and thus generates a MAC-subPDU C51. In the MAC subheader, as the LCID, "1" that is an identifier of the logical channel to which the discarded data belongs is set.

In FIG. 10, moreover, the RLC layer of the transmission apparatus 100, which is notified that the PDCP-PDUs A2 and A3 are discarded, generates a control PDU B52 in the RLC layer, which corresponds to second discarding notification information corresponds to the RLC layer. In the control PDU in the RLC layer, a header and a payload are also originally integrated into one piece, but in FIG. 10, the header and the payload are expressed as "RLC HDR" and "RLC CTRL", respectively. A format of the control PDU B52 in the RLC layer, which is the first discarding notification information will be described below.

In FIG. 10, the MAC layer of the transmission apparatus 100 adds the MAC subheader to an RLC-PDU B52 and generates a MAC-subPDU C52. In the MAC subheader, as the LCID, "1" that is the identifier of the logical channel to which the discarded data belongs is also set.

Figure 11A:
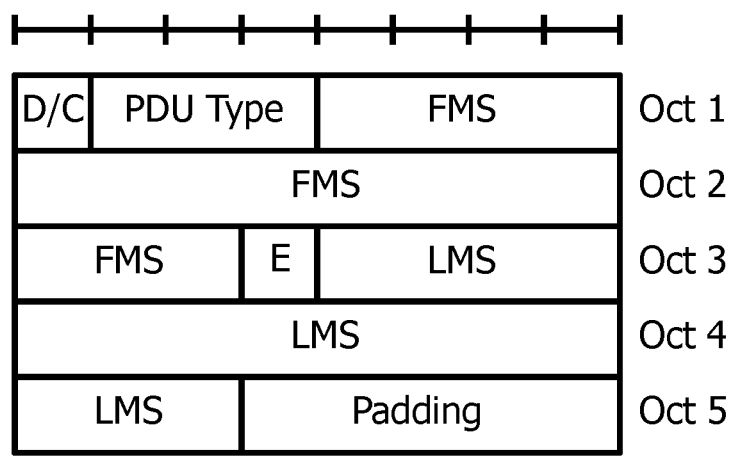
FIGS. 11A and 11B are diagrams each illustrating an example of first discarding notification information relating to the fifth embodiment.

FIG. 11A illustrates an example of the format of the control PDU A51 in the PDCP layer, which is the first discarding notification information according to the fifth embodiment. FIG. 11A is equivalent to the first discarding notification information that is of a so-called long type and is 5-octet information. The control PDU that is illustrated in FIG. 11A includes a D/C field, a PDU type field, an FMS field, an E field, an LMS field, and a padding.

Each field of the control PDU in the PDCP layer that is illustrated in FIG. 11A is described. The D/C field is a one-bit field indicating whether there is a data PDU or a control PDU. For example, in the case of the control PDU, 0 can be set to be in the D/C field. The PDU type field is a 3-bit field indicating a type of control PDU. As of the present application filing data, only "000", "001", and "010" had been already used as values in the PDU type field, and because of this, a value in the PDU type field in the first discarding notification information that is illustrated in FIG. 11A, for example, can be set to "011". In the same manner as the FMS field according to the third embodiment described above, the FMS field is a 15-bit field indicating an initial sequence number in the contiguous discarded PDCP-PDU group. The E field is a one-bit field indicating whether there is information that follows. In FIG. 11A, as a value in the E field, "1" indicating that there is information that follows can be set. In the same manner as the LMS field according to the third embodiment described above, the LMS field is a 15-bit field indicating a last sequence number in the contiguous discarded PDCP-PDU group. The padding is a 5-bit long.

Figure 11B:
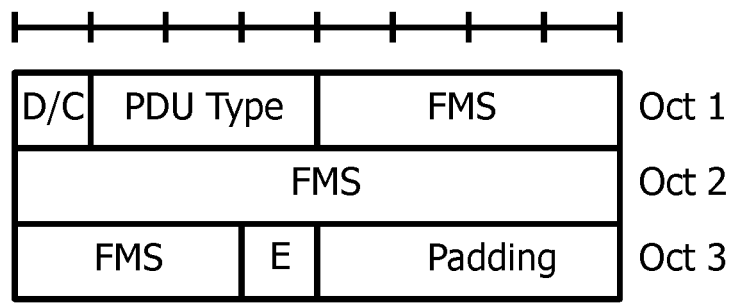

FIG. 11B illustrates another example of the format of the control PDU A51 in the PDCP layer, which is the first discarding notification information according to the fifth embodiment. FIG. 11B is equivalent to the first discarding notification information that is of a so-called short type and is 3-octet information. The control PDU that is illustrated in FIG. 11B includes a D/C field, a PDU type field, an FMS field, an E field, and a padding.

Each field of the control PDU in the PDCP layer that is illustrated in FIG. 11B is described. The D/C field, the PDU type field, and the FMS field are the same as those in FIG. 11A. As a value in the E field in FIG. 11B, "0" indicating there is information that follows can be set. Padding is 4 bits long. That is, switching between the formats in FIGS. 11A and 11B can be performed according to a value in the E field. It is noted that the reason for the absence of the LMS field in FIG. 11B is that it is assumed that the control PDU which is illustrated in FIG. 11B is used in a case where FMS=LMS.

Figure 12A:
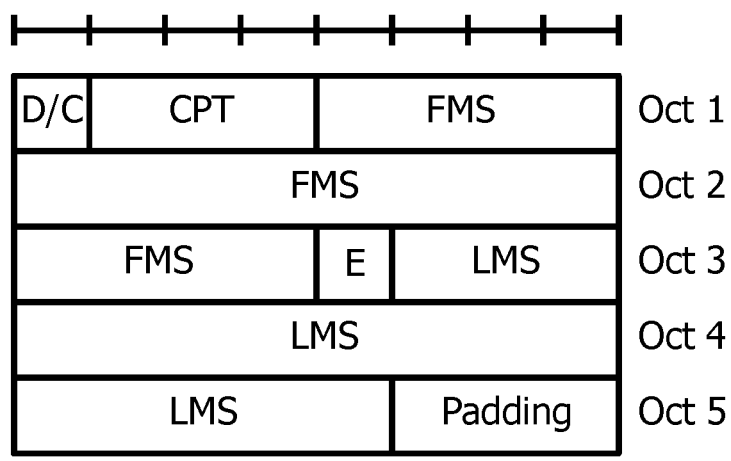
FIGS. 12A and 12B are diagrams each illustrating an example of second discarding notification information relating to the fifth embodiment.

FIG. 12A illustrates an example of the format of the control PDU B52 in the RLC layer, which is the second discarding notification information according to the fifth embodiment. FIG. 12A is equivalent to the second discarding notification information that is of a so-called long type and is 5-octet information. The control PDU that is illustrated in FIG. 12A includes a D/C field, a control PDU type (CPT) field, an FMS field, an E field, an LMS field, and a padding.

Each field of the control PDU in the RLC layer that is illustrated in FIG. 12A is described. The D/C field is a one-bit field indicating whether there is a data PDU or a control PDU. For example, in the case of the control PDU, 0 can be set to be in the D/C field. The CPT type field is a 3-bit field indicating a type of control PDU. As of the present application filing data, only "000" had been already used as a value in the CPT field, and because of this, a value in the CPT field in the first discarding notification information that is illustrated in FIG. 12A, for example, can be set to "001". In the same manner as the FMS field according to the second embodiment described above, the FMS field is a 16-bit field indicating an initial sequence number in a contiguous RLC-PDU group that corresponds to the contiguous discarded PDCP-PDU group. The E field is a one-bit field indicating whether there is information that follows. In FIG. 12A, as a value in the E field, "1" indicating that there is information that follows can be set. In the same manner as the LMS field according to the second embodiment described above, the LMS field is a 16-bit field indicating the last sequence number in the contiguous RLC-PDU group that corresponds to the contiguous discarded PDCP-PDU group. The padding is 3 bits long.

Figure 12B:
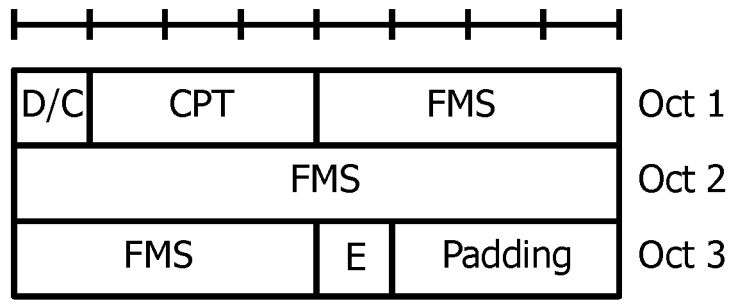

FIG. 12B illustrates another example of the format of the control PDU B52 in the RLC layer, which is the second discarding notification information according to the fifth embodiment. FIG. 12B is equivalent to the second discarding notification information that is of a so-called short type and is 3-octet information. The control PDU that is illustrated in FIG. 12B includes a D/C field, a CPT field, an FMS field, an E field, and a padding.

Each field of the control PDU in the RLC layer that is illustrated in FIG. 12B is described. The D/C field, the CPT field, and the FMS field are the same as those in FIG. 12A. As a value in the E field in FIG. 12B, "0" indicating there is information that follows can be set. The padding is 3 bits long. That is, switching between the formats in FIGS. 12A and 12B can be performed according to a value in the E field. It is noted that the reason for the absence of the LMS field in FIG. 12B is that it is assumed that the control PDU which is illustrated in FIG. 12B is used in the case where FMS=LMS.

Then, FIG. 10, as described above, is equivalent to a data flow in a case where the reordering in the RLC layer of the reception apparatus 200 according to the fifth embodiment is turned on. That is, the transmission apparatus 100 according to the fifth embodiment performs data processing according to the data flow as illustrated in FIG. 10, in a case where the reordering in the RLC layer of the reception apparatus 200 is turned on. Accordingly, in the transmission apparatus 100, a MAC-PDU D51, which includes the control PDU A51 of the PDCP layer that is equivalent to first control information that is illustrated in FIGS. 11A and 11B, and the control PDU B52 of the RLC layer that is equivalent to second control information that is illustrated in FIGS. 12A and 12B, is generated, and the generated MAC-PDU D51 is transmitted to the reception apparatus 200.

On the other hand, the reception apparatus 200 according to the fifth embodiment extracts data according to the data flow that is opposite in direction to that in FIG. 10. That is, when receiving the MAC-PDU D51, the reception apparatus 200 performs processing such as removal of the MAC subheader in the MAC layer and extracts each of the RLC-PDUs B1, B51, and B52. At this time, the RLC layer of the reception apparatus 200 performs the reordering (it is noted that FIG. 10 corresponds to a case where the reordering of the RLC layer is turned on), but can suitably cause the targets for the reordering in the RLC layer not to include the data that is discarded by the transmission apparatus 100, based on the control PDU B52 of the RLC layer that is equivalent to the second control information.

Moreover, the reception apparatus 200 according to the fifth embodiment performs processing such as removal of the RLC header in the RLC layer and extracts the PDCP-PDUs A1 and A51. At this time, the PDCP layer of the reception apparatus 200 performs the reordering, but can suitably cause the targets for the reordering in the PDCP layer not to include the data that is discarded by the transmission apparatus 100, based on the control PDU A51 of the PDCP layer that is equivalent to the first control information.

Figure 13:
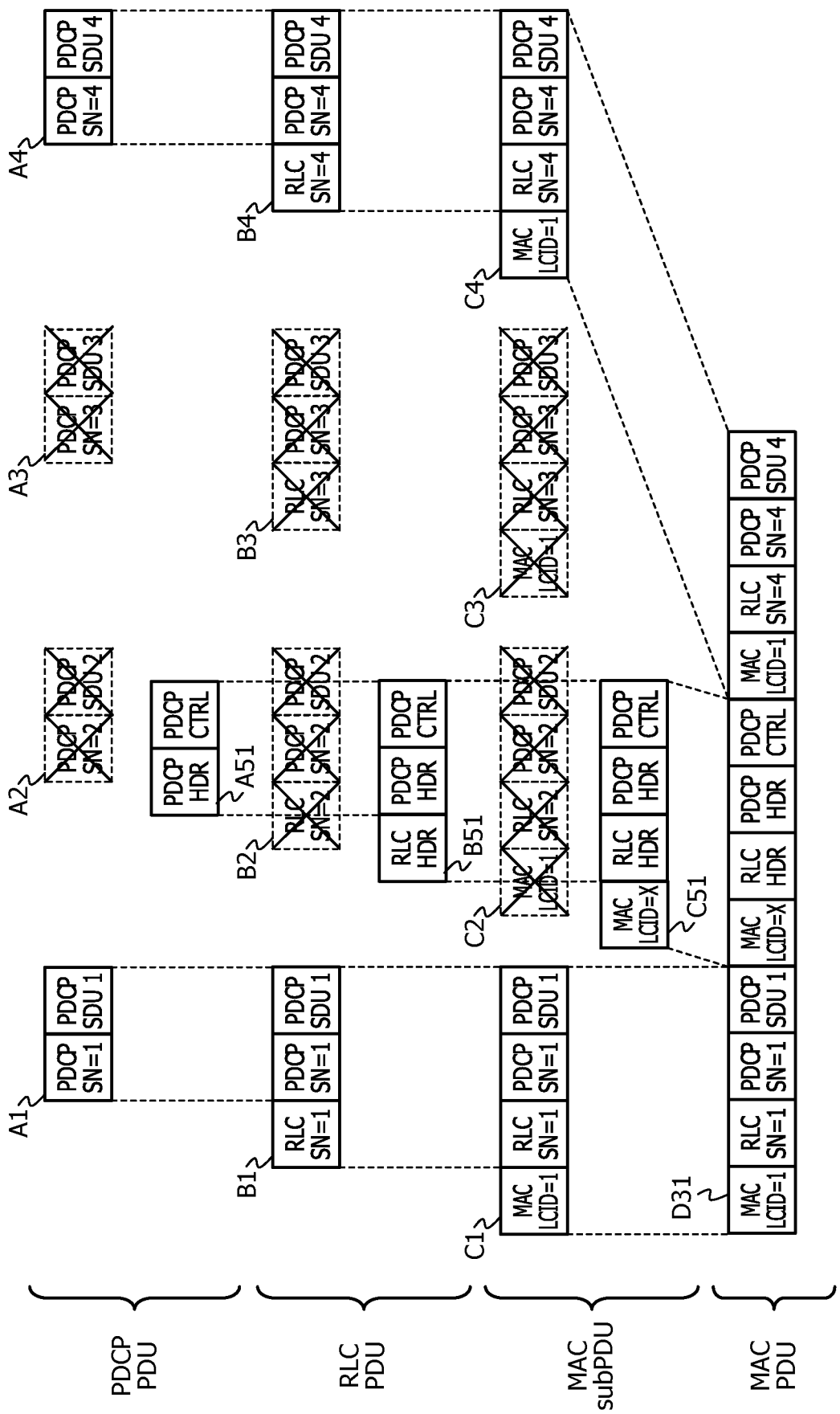
FIG. 13 is a diagram illustrating another example of the data flow for the sublayer of the second layer in the transmission apparatus in the wireless communication system according to the fifth embodiment.

Subsequently, FIG. 13 illustrates another example of the data flow for the sublayer that is the second layer in the transmission apparatus 100 in the wireless communication system according to the fifth embodiment. FIG. 13 is equivalent to a data flow in a case where the reordering is turned off in the RLC layer described above. It is noted that FIG. 13 presupposes FIGS. 1 and 2 and other figures and that these figures are referred to for description where relevant.

FIG. 13 has much in common with FIG. 10, and because of this, only a difference is described here. In FIG. 13, the control PDU A51 in the PDCP layer, which is the first discarding notification information, is used in the same manner as in FIG. 10. In contrast with this, in FIG. 13, the control PDU B52 in the RLC layer, which is the second discarding notification information, is used differently than in FIG. 10. This is because FIG. 13 corresponds to a case where the reordering in the RLC layer is turned off in the reception apparatus 200. That is, to begin with, the reordering is not performed on the RLC layer in the reception apparatus 200, and the RLC layer on the receiving side does not have to be aware of the missing number among the sequence numbers. Because of this, the control PDU B52 in the RLC layer, which is the second discarding notification information, does not have to be used.

At this point, in the fifth embodiment, in a case where the reordering in the RLC layer, as illustrated in FIG. 10, is turned on, the reordering in the RLC layer is controlled by the second discarding notification information B52 that is the control PDU of the RLC layer. Furthermore, the reordering in the PDCP layer is controlled by the first discarding notification information A51 that is the control PDU of the PDCP layer. On the other hand, in a case where the reordering in the RLC layer, as illustrated in FIG. 13, is turned off, the reordering in the PDCP layer is also controlled by the first discarding notification information A51 that is the control PDU of the PDCP layer. Therefore, it can be understood that the fifth embodiment satisfies the cross-layer design principle described above.

According to the fifth embodiment described above, in the same manner as in each of the embodiments described above, in the case where, among the multiple pieces of data, the discarding occurs, the imperfection relating to the reordering processing by the reception apparatus 200 can be corrected without performing the reassigning of the sequence number on the pieces of past-discarding data. Accordingly, according to the fifth embodiment, it is possible that the Ultra-Reliable and Low-latency Communications are realized and that the problem which can correspondingly occur is solved.

Sixth Embodiment

A sixth embodiment is also an example of an embodiment that results from the disclosure in the present application finding application in the 5G system.

The sixth embodiment is embodiment to a modification example of the fifth embodiment and has much in common with the fifth embodiment. Thus, in the following, what distinguishes the sixth embodiment from the fifth embodiment is described below in a focused manner.

Figure 14A:
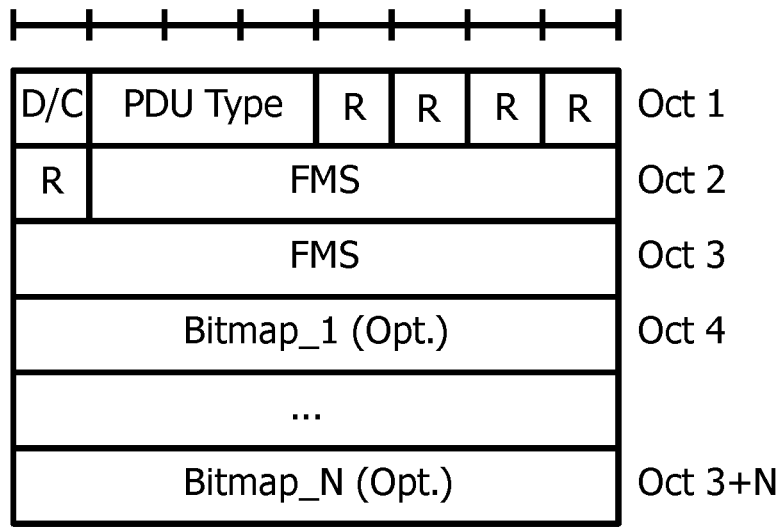
FIGS. 14A and 14B are diagrams each illustrating an example of discarding notification information according to a sixth embodiment.

FIG. 14A illustrates an example of the format of the control PDU A51 in the PDCP layer, which is the first discarding notification information according to the sixth embodiment. The control PDU that is illustrated in FIG. 14A has a variable length and is (3+N)-octet information. The control PDU that is illustrated in FIG. 14A includes a D/C field, a PDU type field, an R field, an FMS field, and a bitmap field.

Each field of the control PDU in the PDCP layer that is illustrated in FIG. 14A is described. The D/C field and the FMS field are the same as those in FIG. 11A. As an example, in the same manner as in FIG. 11A, "011" is set to be in the PDU type field. The R field is a so-called reserved field. A bitmap is similar to the bit map according to the fourth embodiment. The discarding or non-discarding of data that corresponds to each sequence number in the PDCP layer is specified by this bitmap. At this point, for example, "0" is set for a bit that corresponds to the sequence number of the data that is discarded, and "1" can be set for a bit that corresponds to the sequence number of the data that is not discarded. Furthermore, the most significant bit in the bitmap corresponds to data having a sequence number that is illustrated in the FMS field. As an example, in FIG. 10, as an example, because pieces of data having sequence numbers 2 and 3 in the PDCP layer are discarded, "001" is set to be in first three bits in the bitmap in this case (the discarding or non-discarding of pieces of data having sequence numbers FMS=2, FMS+1=3, and FMS+2=4 is indicated starting from the most significant bit in the bitmap). With the discarding notification information that is illustrated in FIG. 14A, the discarding of non-contiguous (randomly-distributed) pieces of data can be efficiently dealt with.

It is noted that, in the standards for 4G as of the present application filing date, the format that formally has the same contents as the format of the control PDU in the PDCP layer that is illustrated in FIG. 14A had been stipulated. The control PDU is referred to as "status report", and as a value in the PDU type field, "000" had been already allocated. For that reason, it is also considered that a value in the PDU type field in the control PDU that is illustrated in FIG. 14A is set to "000". However, the status report is a control PDU with which the data receiving side notifies the data transmitting side of data that is lost (a so-called transmission error) because of noise or the like during wireless communication. In contrast with this, the control PDU in FIG. 14A is a control PDU with which the data transmission side notifies the data receiving side of data that is discarded on the data transmission side. In this manner, these PDUs have a common format, but are different in transmission direction and application from each other. Because of this, it is desirably noted that, according to an aspect, the PDUs are favorably handled as separate control PDUs.

Figure 14B:
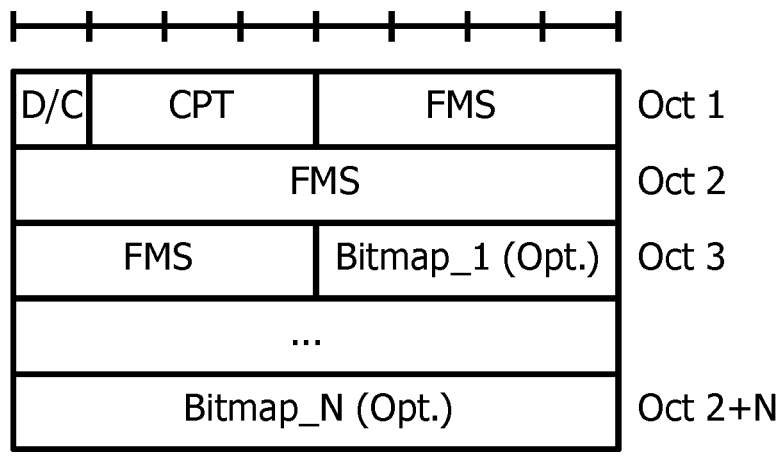

FIG. 14B illustrates an example of the format of the control PDU B52 in the RLC layer, which is the second discarding notification information according to the sixth embodiment. The control PDU that is illustrated in FIG. 14B has a variable length, and is (2+N)-octet information. The control PDU that is illustrated in FIG. 14B includes a D/C field, a CPT field, a FMS field, and a bitmap field.

Each field of the control PDU in the RLC layer that is illustrated in FIG. 14B is described. The D/C field, the CPT field, and the FMS field are the same as those in FIG. 12A. A bitmap is similar to the bitmap according to the fourth embodiment. With the bitmap, the discarding or non-discarding of data that corresponds to each sequence number in the RLC layer is specified. At this point, for example, "0" is set for a bit that corresponds to the sequence number of the data that is discarded, and "1" can be set for a bit that corresponds to the sequence number of the data that is not discarded. Furthermore, the most significant bit in the bitmap corresponds to data having a sequence number that is illustrated in the FMS field. As an example, in FIG. 10, as an example, because pieces of data having sequence numbers 2 and 3 in the RLC layer are discarded, "001" is set to be in first three bits in the bitmap in this case (the discarding or non-discarding of pieces of data having sequence numbers FMS=2, FMS+1=3, and FMS+2=4 is indicated starting from the most significant bit in the bitmap). With the discarding notification information that is illustrated in FIG. 14B, the discarding of non-contiguous (randomly-distributed) pieces of data can be efficiently dealt with.

According to the sixth embodiment described above, in the same manner as in each of the embodiments described above, in the case where, among the multiple pieces of data, the discarding occurs, the imperfection relating to the reordering processing by the reception apparatus 200 can be corrected without performing the reassigning of the sequence number on the pieces of past-discarding data. Accordingly, according to the sixth embodiment, it is possible that the Ultra-Reliable and Low-latency Communications are realized and that the problem which can correspondingly occur is solved.

Seventh Embodiment

A seventh embodiment is an example of an embodiment that results from adapting the disclosure in the present application to the 5G system. A basic processing flow and the like in the seventh embodiment are the same as those in other embodiments. Thus, in the following, what distinguishes the seventh embodiment from any other embodiments is described in a focused manner.

The first to sixth embodiments are described above on the assumption that the processing that is the preprocessing in the second layer is performed until the MAC-subPDU is generated. In the seventh embodiment, an example where the preprocessing is performed until the PDCP-PDU is generated is described. Therefore, the preprocessing according to the seventh embodiment, for example, performs functions that the PDCP layer has, such as encryption and head compression in the PDCP layer.

Figure 15:
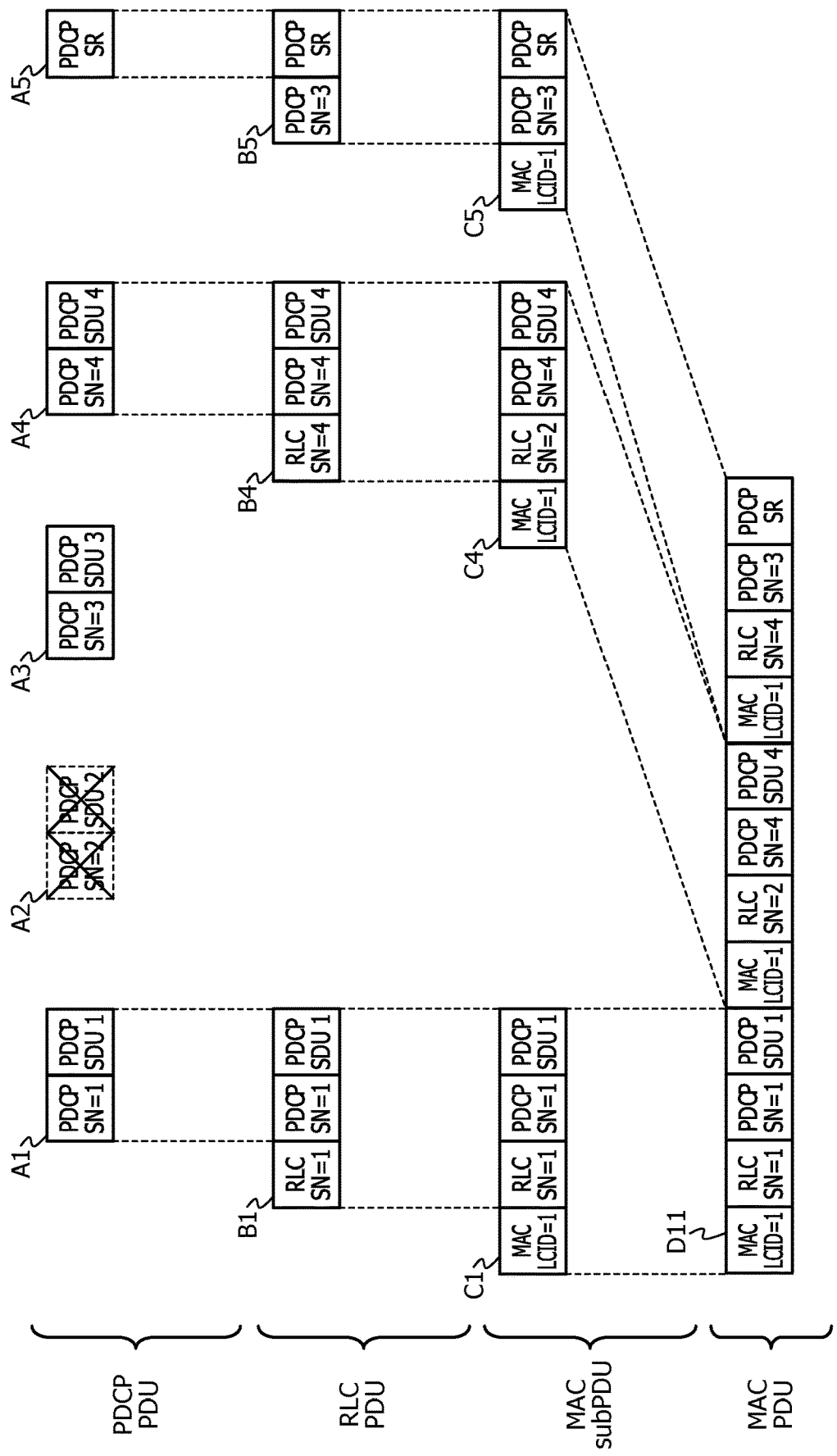
FIG. 15 is a diagram illustrating an example of a data flow for a sublayer of the second layer in a transmission apparatus in a wireless communication system according to a seventh embodiment.

FIG. 15 illustrates an example of a data flow for a sublayer of the second layer in a transmission apparatus 100 in a wireless communication system according to the seventh embodiment. It is noted that FIG. 15 presupposes FIGS. 1 and 2 and other figures and that these figures are referred to for description where relevant.

In FIG. 15, an example of a data flow in a case where PDCP-PDUs A2 and A3 are set to be targets to be discarded and where the PDCP-PDUs A2 and A3 are transferred to each sublayer after being discarded is illustrated. At this time, in the same manner as in other embodiments, the transmission apparatus 100 according to the seventh embodiment notifies the reception apparatus 200 of the discarding notification information (that is, the discarding notification information that possibly specifies the discarded data) indicating that the data is discarded.

In the seventh embodiment, as the discarding notification information, a PDCP status report (PDCP-SR) is used. It is noted that the PDCP-SR, for example, is generated as the control PDU of the PDCP layer. As illustrated in FIG. 15, the notification that the PDCP-PDUs A2 and A3 are discarded is received and the PDCP-PDUs A1 and A4 other than the discarded PDCP-PDUs A2 and A3 are transferred to an RLC sublayer. Furthermore, the discarded information is generated as the PDCP-SR and the generated PDCP-SR is transferred to the RLC layer. In the RLC layer, the transferred PDCP-PDUs A1 and A4 and the PDCP-SR A5, to which header information is assigned, are transferred to the MAC layer. It is noted that in an example in FIG. 15, the sequence number is added as the header information of the RLC layer, and that, as the SNs of the RLC-PDUs, SN of RLC-PDU B1=1, SN of RLC-PDU B4=2, and SN of RLC-PDU B5=3. It is noted that, in the same manner as the PDCP-PDU, in the RLC layer, the PDCP-SR is processed as one data unit.

In the PDCP layer, the MAC layer assigns a head to the RLC-PDUs B1, B4, and B5, and generates the MAC-subPDU C21.

At this point, as described above, there is an LCID in the MAC subheader, and, as the LCID, "1" that is an identifier of the corresponding data channel is set.

Then, a MAC-PDU D71 is generated from each of the MAC-subPDUs C1, C4, and C5. The transmission apparatus 100 transmits the MAC-PDU D71.

The reception apparatus 200 performs processing of the received MAC-PDU D71 for every sublayer. It is noted that, because there is no discarding notification information in a sublayer other than the PDCP layer, in a case where the reordering (delivery in order of number) is performed, sequential reordering is possible. Furthermore, from information of the PDCP-SR, the PDCP layer understand that the PDCP-PDUs A2 and A3 are discarded, and thus the reordering is possible with the PDCP-PDUs A2 and A3 being excluded.

It is desirably noted that as in any other embodiments, in a case where the discarding of the data occurs, it is also assumed that the transmission apparatus 100 according to the seventh embodiment also presupposes that the reassigning of the sequence numbers (renumbering) is performed. For example, in FIG. 15, the PDCP-PDUs A2 and A3 are discarded, but the reassigning of the sequence numbers in the PDCP layer or the RLC layer is not performed. Accordingly, the missing number occurs among the sequence numbers in the PDCP layer or the RLC layer. Thus, the transmission apparatus 100 according to the seventh embodiment transmits the discarding notification information, as described above, to the reception apparatus 200. Accordingly, it is possible that the reception apparatus 200 according to the seventh embodiment explicitly recognizes that the missing number among the sequence number of pieces of data is based on the discarding of the data in the transmission apparatus 100.

According to the seventh embodiment described above, in the same manner as in each of the embodiments described above, in the case where, among the multiple pieces of data, the discarding occurs, the imperfection relating to the reordering processing by the reception apparatus 200 can be corrected without performing the reassigning of the sequence number on the pieces of past-discarding data. Accordingly, according to the seventh embodiment, it is possible that the Ultra-Reliable and Low-latency Communications are realized and that the problem which can correspondingly occur is solved. Furthermore, in the seventh embodiment, cross-layer scheduling is not performed, and thus, the number of times of processing in the RLC layer can be reduced.

Eighth Embodiment

An eighth embodiment is an example of an embodiment that results from adapting the disclosure in the present application to the 5G system.

A basic processing flow and the like in the eighth embodiment are the same as those in other embodiments. Thus, in the following, what distinguishes the ninth embodiment from other embodiments is described in a focused manner.

In the second to seventh embodiments, an example of a case of one channel (one LCID) is described. In the eighth embodiment, as an example of multiple channels, a case of two channels (two LCIDs) is described. It is noted that a description of the eighth embodiment is provided using a first channel that corresponds to a first LCID and a second channel that correspond to a second LCID, but that no limitation to this is imposed.

Figure 16B:
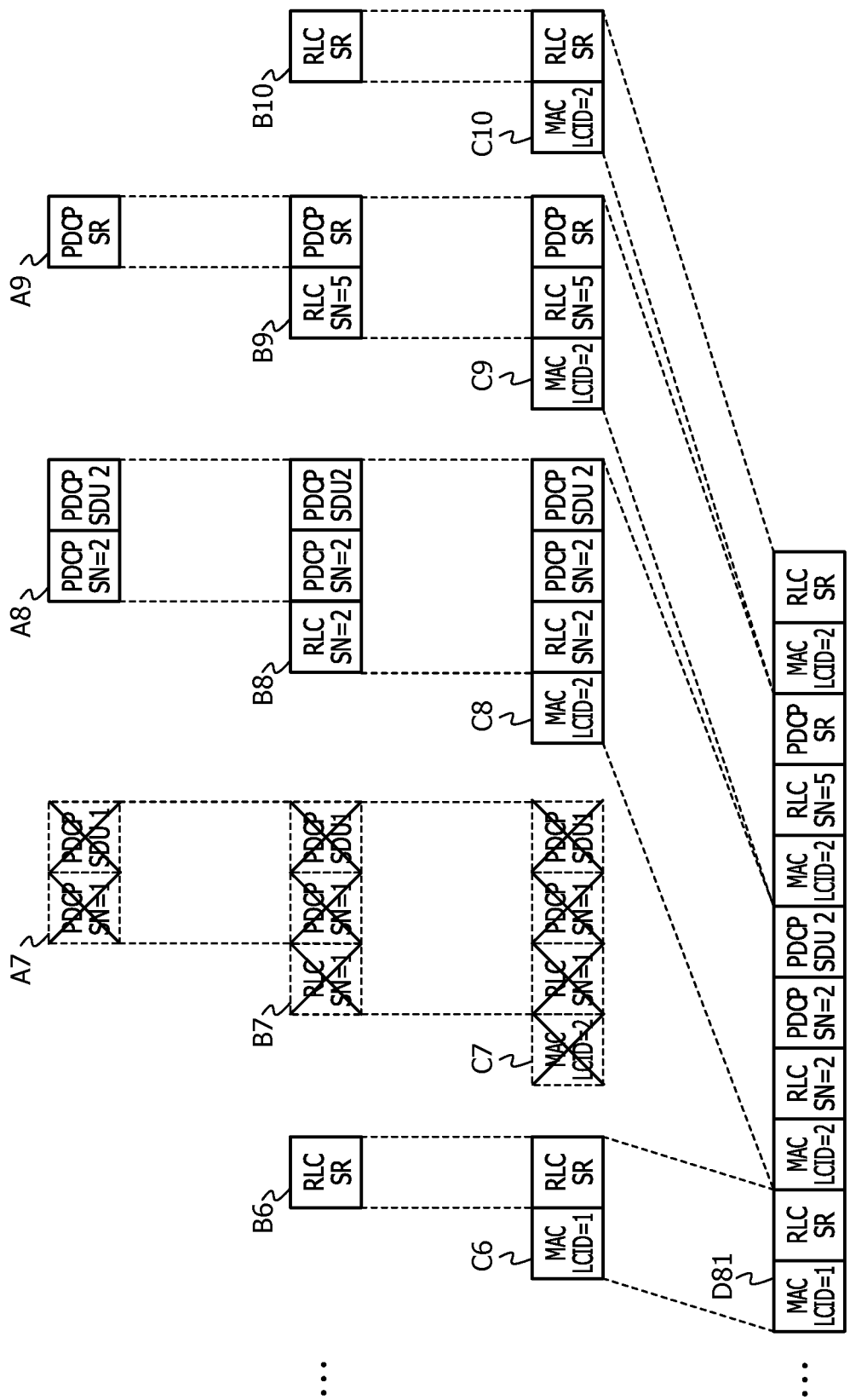

FIG. 16 (i.e., FIGS. 16A and 16B) illustrates an example of a data flow for a sublayer of the second layer in a transmission apparatus 100 in a wireless communication system according to the eighth embodiment. It is noted that FIG. 16 presupposes FIGS. 1 and 2 and other figures and that, because of this, these figures are referred to for description where relevant. Furthermore, in the same manner as in the first to sixth embodiment, a case where the processing that is the preprocessing in the second layer is performed until the MAC-subPDU is generated is described with reference to FIG. 16. It is noted that PDUs of each sublayer of the first layer that corresponds to the first channel are PDCP-PDUs A1 to A5, RLC-PDUs B1 to B6, and MAC-subPDUs C1 to C6. Furthermore, PDUs of each sublayer of the second layer that corresponds to the second channel are PDCP-PDUs A7 to A9, RLC-PDUs B7 to B10, and MAC-subPDUs C7 to C10.

In the transmission apparatus 100 according to the eighth embodiment, according to the discarding notification information in each channel, the PDCP-SR A5 and PDCP-SR A9 are generated in the PDCP layer, and the PDCP-SR B6 and the PDCP-SR B10 are generated in the RLC layer.

The transmission apparatus 100 according to the eighth embodiment performs processing (such as assigning of a sequence number) in each sublayer of the second layer, and concatenates a channel 1 and a channel 2 in a MAC-PDU D81. It is noted that the discarding notification information is transmitted with the PDCP-SR in the case of the PDCP layer and is transmitted with the RLC-SR in the case of the RLC layer.

The reception apparatus 200 performs the reception processing in each layer based on the discarding notification information that is included in the PDCP-SR or the RLC-SR.

It is noted that in FIG. 16, the PDCP-SR or the RLC-SR is assigned to the rear (footer) of each channel, but that, without a limitation to this is imposed, for example, may be positioned in the front (header) of a channel or in any space in the discarded SDU.

Furthermore, regardless of a channel, at least one SR of the PDCP-SR and the RLC-SR that are included in the discarding notification information, as in an example that is illustrated in FIGS. 17A to 17C, may be collectively positioned in a portion of the MAC-PDU. FIG. 17A illustrates an example of a MAC-PDU D81*a* in which, in contrast with the arrangement in the MAC-PDU D81 in FIG. 16, pieces of information relating to the PDCP-SR and the RLC-SR are arranged in the rear (footer) and pieces of information other than these are sequentially arranged. It is noted that, in the case of the PDCP-SR, the information relating to each of the PDCP-SR and the RLC-CR, for example, is an RLC-SN that, in the RLC layer, is assigned to the PDCP-SR, or an LCID that is assigned in a MAC sublayer. Furthermore, the information relating to the RLC-SR, for example, is an LCID that is assigned to the RLC-SR when the MAC-subPDU is generated.

FIG. 17B illustrates an example of a MAC-PDU D81*b* in which pieces of information relating to the PDCP-SR and the RLC-SR are arranged in the rear (footer) and pieces of information other than these are sequentially arranged. Furthermore, FIG. 17C illustrates a first example of a MAC-PDU D81*c* in which information relating to the RLC-SR is arranged in the rear (footer) and pieces of information other than this are sequentially arranged.

It is noted that in FIG. 17A to 17C, the example of the arrangement in the rear (footer) of the MAC-PDU is illustrated, but an arrangement in the front (header) of the MAC-PDU may be made. Furthermore, the PDCP-SR may be positioned in the front (header), and the RLC-SR may be positioned in the rear (footer). In this manner, the information in the SR of each layer is positioned in the front (header) or the rear (footer) of the MAC-PDU, and thus the reordering (delivery in order of number) in at least one sublayer in the second layer can be simplified.

Furthermore, the description of the eighth embodiment so far is provided on the assumption of the processing in every layer. However, in a case where, as in the second to fourth embodiments, the processing is performed in a cross layer, regardless of a channel, the discarding notification information may be collectively generated as one piece of information and the resulting information may be transmitted. In this case, for example, the discarding notification information of each layer is notified using the MAC CE that is described in the embodiment such as the second embodiment.

Moreover, although described in the fifth embodiment or the seventh embodiment, the case where the reordering is not performed in the RLC layer is also considered. Even in this case, there is a merit that the reception processing can be advanced by transmitting the discarding notification information of the RLC layer to the reception apparatus 200 and thus by the reception apparatus 200 receiving the discarding notification information. In such a case, when the reception apparatus 200 performs reporting on an RLC-reception state to the transmission apparatus 100, a NACK is reported regarding the discarded RLC-PDU. However, the transmission apparatus 100 may ignore NACK information and may omit retransmission of the RLC layer. Alternatively, regarding the RLC-PDU that is discarded, the reception apparatus 200 may report to the transmission apparatus 100 by transmitting an ACK, which means that the processing is completed.

It is noted that in the eighth embodiment, it is also possible that the processing is performed in each layer using the processing that is the preprocessing up to and including the generation of the PDCP-PDU that is described in the seventh embodiment.

According to the eighth embodiment described above, in the same manner as in each of the embodiments described above, in the case where, among the multiple pieces of data, the discarding occurs, the imperfection relating to the reordering processing by the reception apparatus 200 can be corrected without performing the reassigning of the sequence number on the pieces of past-discarding data. Accordingly, according to the eighth embodiment, it is possible that the Ultra-Reliable and Low-latency Communications are realized and that the problem which can correspondingly occur is solved. Furthermore, in the eighth embodiment, in the case of multiple channels, the same effect as in the embodiments described can also be obtained.

Ninth Embodiment

A ninth embodiment is an example of an embodiment that results from adapting the disclosure in the present application to the 5G system.

A basic processing flow and the like in the ninth embodiment are the same as those in other embodiments. Thus, in the following, what distinguishes the ninth embodiment from other embodiments is described in a focused manner.

In the second to sixth embodiments and the eighth embodiment, the descriptions are provided based on the example where the processing that is the preprocessing in the second layer is performed until the MAC-subPDU is generated. Furthermore, in the seventh embodiment, the description is provided based on the example where the processing that is preprocessing in the second layer is performed until the PDCP-PSU is generated. In the ninth embodiment, a case where multiple levels (or depths) of the processing that is the preprocessing are used is described.

It is noted that, in a case where the preprocessing up to and including the generation of the PDCP-PDU is performed, the level of the processing that is the preprocessing, according to the ninth embodiment is defined as Level 1 (or Depth 1) and that in a case where the preprocessing up to and including the generation of the MAC-subPDU is performed, the level of the processing is defined as Level 2 (Depth 2).

Figure 18:
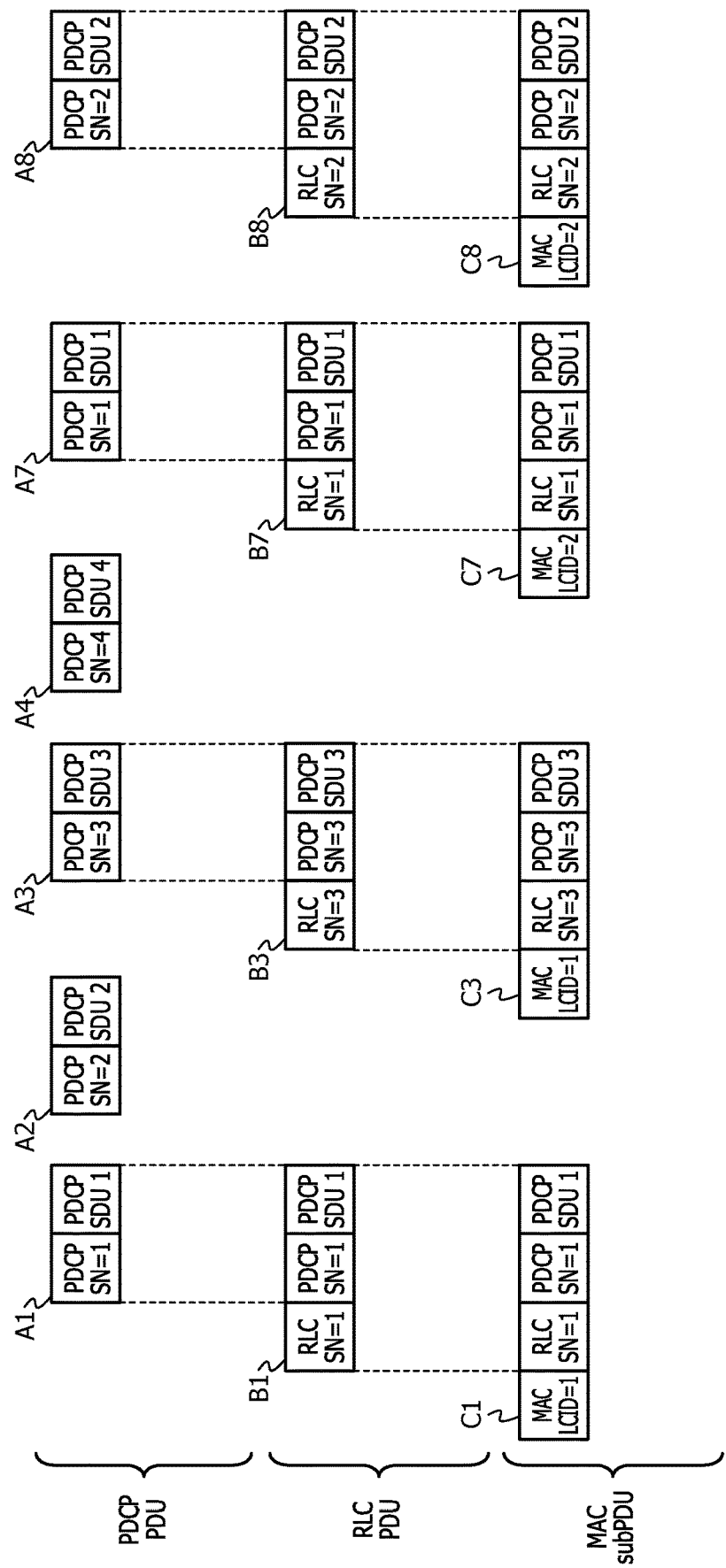
FIG. 18 is a diagram illustrating an example of a data flow (prior to discarding processing) for a sublayer of the second layer in a transmission apparatus in a wireless communication system according to a ninth embodiment.

FIG. 18 illustrates an example of a data flow for a sublayer of the second layer prior to discarding processing in a transmission apparatus 100 in a wireless communication system according to the ninth embodiment. It is noted that FIG. 18 presupposes FIGS. 1 and 2 and other figures and that these figures are referred to for description where relevant.

In FIG. 18, PDUs of each sublayer of the second layer that corresponds to the first channel are PDCP-PDUs A1 to A4, RLC-PDUs B1 to B3, and MAC-subPDUs C1 to C3. Furthermore, PDUs of each sublayer of the second layer that corresponds to the second channel are PDCP-PDUs A7 to A8, RLC-PDUs B7 to B8, and MAC-subPDUs C7 to C8.

Furthermore, in FIG. 18, the preprocessing up to and including the generation of the MAC-subPDU (Level 2) is performed on the PDUs that correspond to the PDCP-PDUs A1, A3, A7, and A8. Furthermore, the preprocessing in the PDCP layer (Level 1) is performed on the PDUs that correspond to the PDCP-PDUs A2 and A4.

Figure 19B:
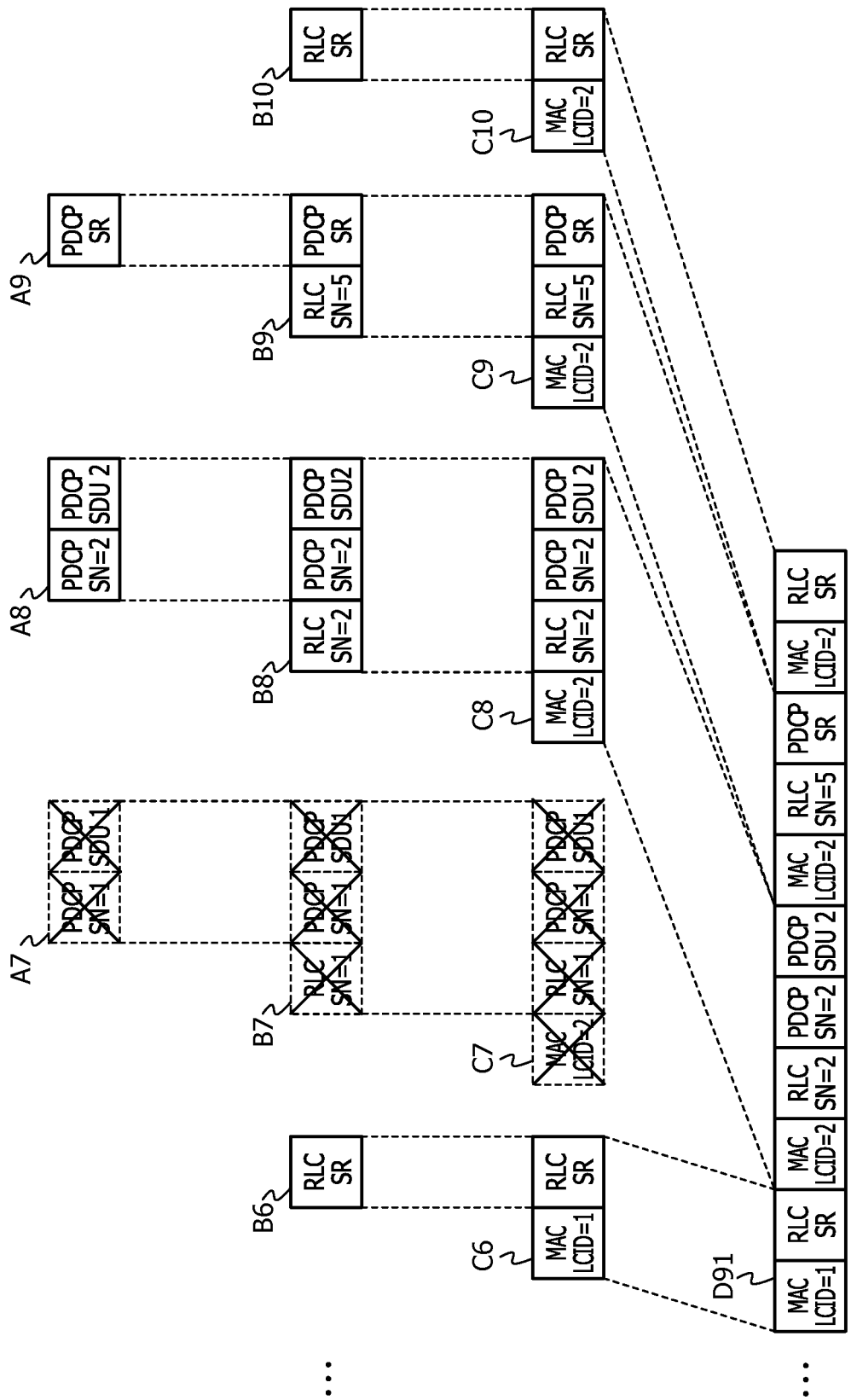

FIG. 19 (i.e., FIGS. 19A and 19B) illustrates an example of a data flow for a sublayer of the second layer subsequent to the discarding processing, in the transmission apparatus 100 in the wireless communication system according to the ninth embodiment. It is noted that FIG. 19 presupposes FIGS. 1 and 2 and other figures and that these figures are referred to for description where relevant. Furthermore, in FIG. 19, a data flow up and including a step of configuring the MAC-PDU in a case, from a state of each sublayer that is illustrated in FIG. 18, in the first channel, two PDCP-PDUs, the PDCP-PDUs A2 and A3 are discarded, and where, in the second channel, two PDCP-PDUs, PDCP-PDUs A7, are discarded is illustrated. It is noted that, due to the discarding of the PDCP-PDUs A2, A3, and A7, the PDCP-SRs A5 and A9 that correspond to channels, respectively, are generated in the PDCP layer. Furthermore, due to the discarding of the RLC-PDUs, the RLC-SRs B6 and B10 that corresponds to channels, respectively, are generated in the RLC layer.

It is noted that in FIG. 19, the PDCP-SR A5 has information indicating the discarding of two PDCP-PDU, the PDCP-PDUs A2 and A3, which correspond to the first channel. Furthermore, in FIG. 19, the PDCP-SR A9 has information indicating the discarding of one PDCP-PDU, the PDCP-PDU A7, which corresponds to the second channel.

Furthermore, in FIG. 19, the RLC-SR B6 has information indicating the discarding of one RLC-PDU, the RLC-PDU B3, which corresponds to the first channel. Furthermore, in FIG. 19, the RLC-SR B10 has information indicating the discarding of one RLC-PDU, the RLC-PDU B7, which corresponds to the second channel. It is noted that the transmission apparatus 100 according to the ninth embodiment generates the RLC-PDU B4 and the MAC-subPDU C4 that correspond to the PDCP-PDU A4, in each layer, until the MAC-PDU D91 is generated.

As in the ninth embodiment, multiple levels of the processing that is the preprocessing are used, and thus, for example, processing in accordance with an amount of latency, which is desirable, is possible. For example, in the 5G system, multiple use cases that vary in a permissible amount of latency. In each of the user cases that are assumed, the permissible amount of latency can be optimized. For example, this can reduce the number of RLC-PDUs that are discarded in the RLC sublayer, compared with a case where up to the MAC-subPDU is generated for all PDCP-PDUs. Furthermore, for example, even in a case where, as in URLLC, the ultra-low latency is desirable, the level of the processing that is the preprocessing can be changed to deal with this requirement.

Furthermore, the level of the processing that is the preprocessing may differ from one use case of a channel to another. For example, for a channel that supports the URLLC, the preprocessing up to and including the Level-2 preprocessing is performed, and for a channel that supports any other data (for example, eMMB data), the preprocessing up to and including the preprocessing is performed up to Level 1. Then, when pieces of data are concatenated in the MAC-PDU, the MAC-subPDU that performs the Level-2 processing is preferentially concatenated, and thus the URLLC in which the low latency is desirable can be preferentially transmitted.

It is noted that the level of the preprocessing may be set considering communication quality (for example, a transmission situation), a congestion state, and a processing capability of the transmission apparatus 100 or the reception apparatus 200, in addition to what is described above. It is noted that, when the level of the preprocessing is set considering the processing capability of the reception apparatus 200, for example, the transmission apparatus 100 receives the level as information on a UE capability over a PUCCH from the reception apparatus 200.

Figure 20A:
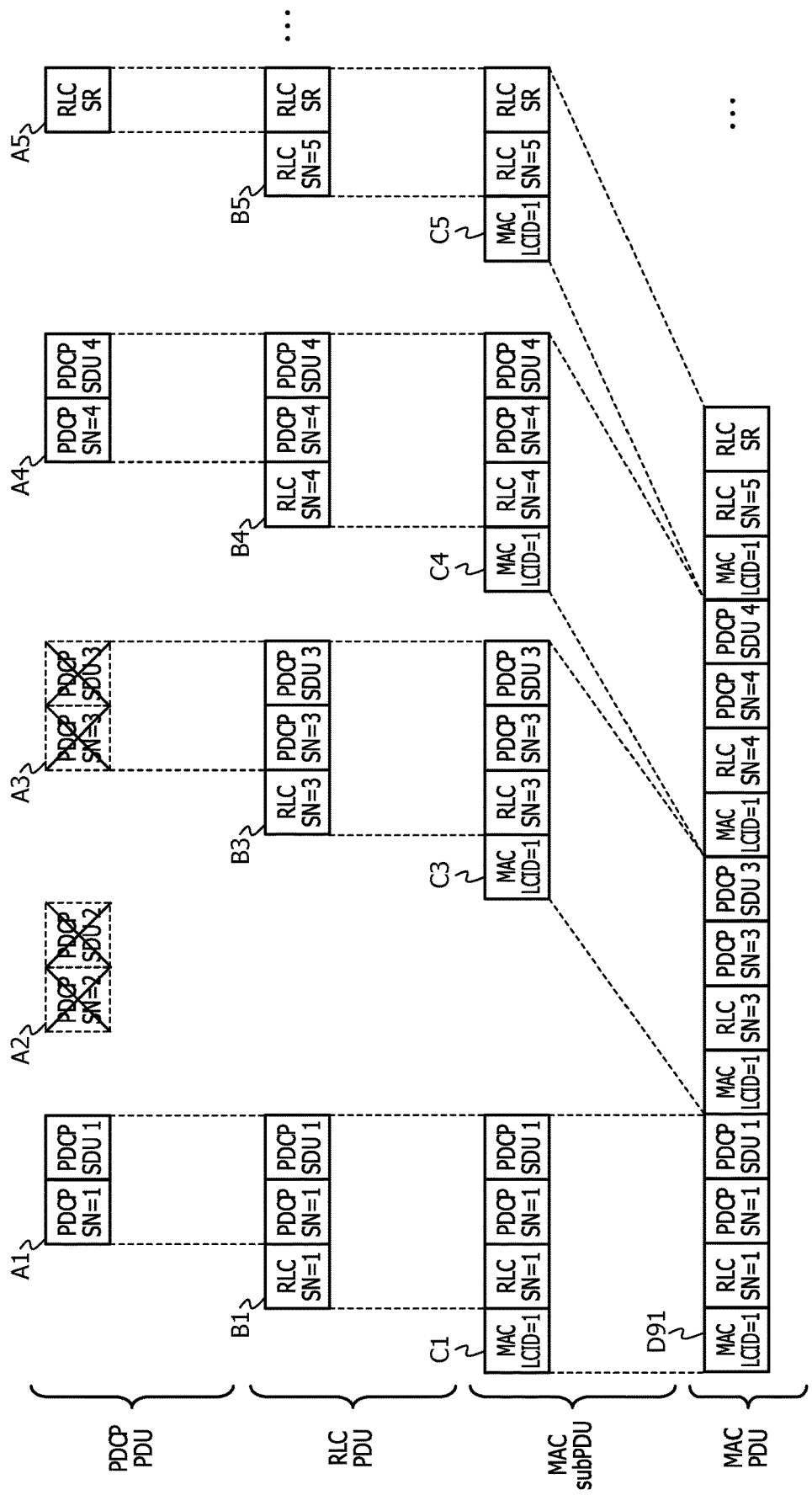
FIGS. 20A and 20B are diagrams illustrating an example of the data flow (subsequent to the discarding processing) for the sublayer of the second layer in the transmission apparatus in the wireless communication system according to the ninth embodiment.
Figure 20B:
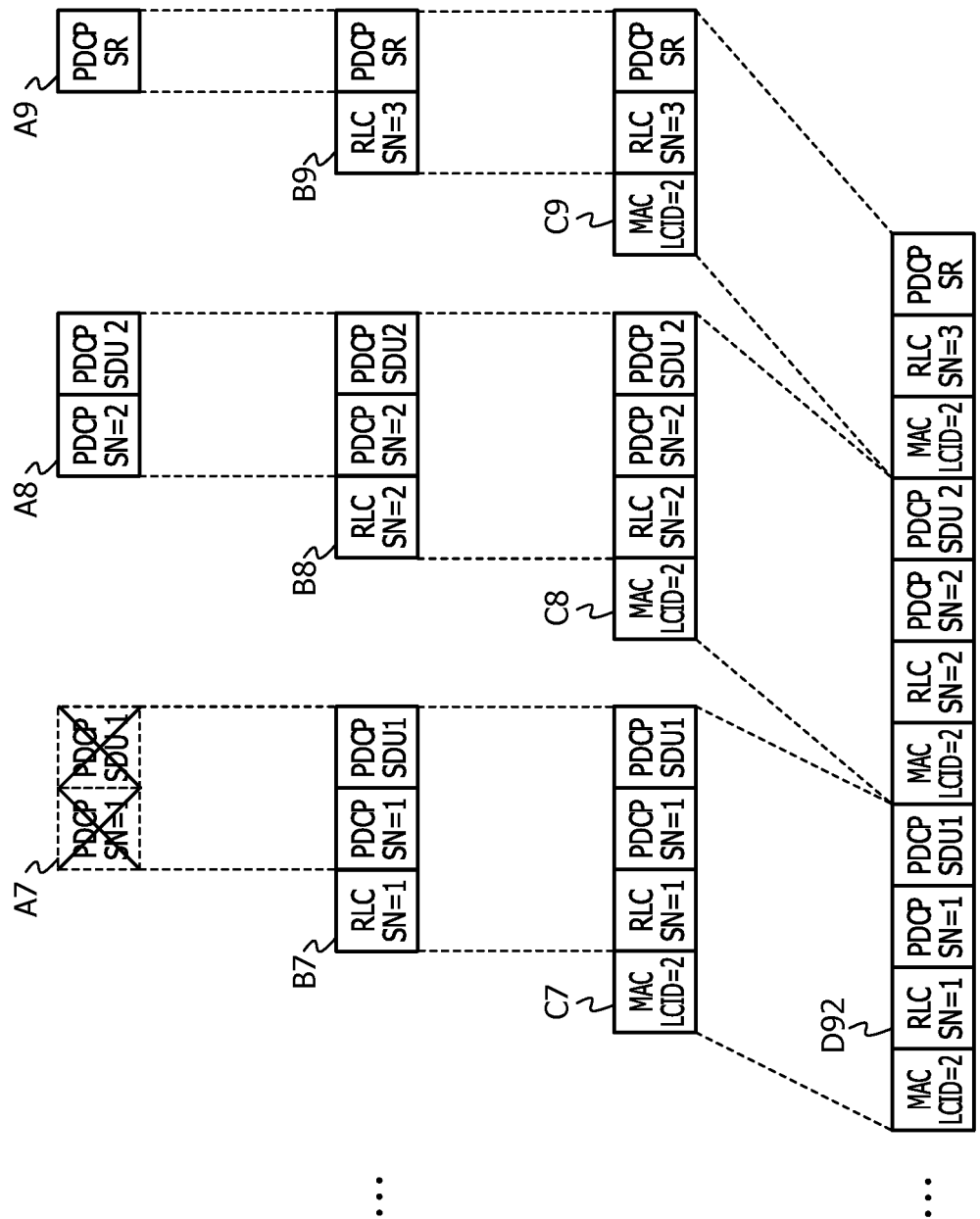

Furthermore, FIG. 20 (i.e., FIGS. 20A and 20B) illustrates another example of the data flow for the sublayer of the second layer subsequent to the discarding processing, in the transmission apparatus 100 in the wireless communication system according to the ninth embodiment. It is noted that what distinguishes FIG. 20 from FIG. 19 is described.

It is noted that, as described with reference to FIG. 19, in FIG. 20, a data flow for constituting the MAC-PDU in a case, from the state of each sublayer that is illustrated in FIG. 18, in the first channel, two PDCP-PDUs, the PDCP-PDUs A2 and A3 are discarded, and where, in the second channel, two PDCP-PDUs, PDCP-PDUs A7, are discarded is illustrated.

In FIG. 20, PDCP SRs A5 and A9 are generated, and the already-generated RLC-PDU is transmitted as is. In summary, in a case where the MAC-subPDU is generated (Level 2), regardless of the discarding notification information, the transmission apparatus 100 transmits the MAC-subPDU to the reception apparatus 200.

In the reception apparatus 200, the processing in accordance with the sequence number in the RLC layer is performed. Furthermore, in the PDCP layer, the processing is performed using the information indicating the discarding, which is retained by the PDCP-SR, and the sequence number in the PDCP layer.

With the configuration of the data flow, as illustrated in FIG. 20, a load on the RLC layer can be reduced.

It is noted that in the ninth embodiment, the case that is expressed using two levels (depths) is described, but that no limitation to this is imposed. For example, a level at which the preprocessing up to and including the generation of the RLC-PDU is performed may be added, and in total, three levels may be used for expression. A level at which the preprocessing is not performed may be added, and in total, four levels may be used for expression.

At this point, as described in any other embodiments (for example, and the seventh embodiments and the eighth embodiment), the present embodiment also has the same merit that the transmission apparatus notifies the reception apparatus of the discarding notification information of the RLC layer.

Furthermore, according to the ninth embodiment described above, in the same manner as in each of the embodiments described above, in the case where, among the multiple pieces of data, the discarding occurs, the imperfection relating to the reordering processing by the reception apparatus 200 can be corrected without performing the reassigning of the sequence number on the pieces of past-discarding data. Accordingly, according to the ninth embodiment, it is possible that the Ultra-Reliable and Low-latency Communications are realized and that the problem which can correspondingly occur is solved. Furthermore, as illustrated in FIG. 20, the load on the RLC layer can be reduced by generating the MAC-PDU and thus excluding from the discarding adaption in the RLC layer the information that corresponds to the scheduling number (SN) that is allocated in the RLC layer of the transmission apparatus 100.

Tenth Embodiment

A tenth embodiment is also an example of an embodiment that results from the disclosure in the present application finding application in the 5G system.

The tenth embodiment is equivalent to a modification example of each of the second to sixth embodiments, and because of this, only a difference from these will be described.

FIGS. 2, 4, 6, 8, 10, 13, 15, 16, 17, 18, 19, and 20, which are referred to above, illustrate the data flow in each of the embodiments in the present application, or in the transmission apparatus 100 in the wireless communication system that presupposes each of the embodiments. Then, in FIGS. 2, 4, 6, 8, 10, 13, and 16, due to the discarding of the PDC-PDU A2 and the like after the preprocessing, the RLC-PDU B2 and the like and the MAC-subPDU C2 and the like are correspondingly discarded. Furthermore, FIGS. 15 and 20, the PCP-PDU A2 and the like are discarded after the preprocessing. Furthermore, in FIG. 19, due to the discarding of the PDCP-PDU A2 and the like after the preprocessing and the discarding of the PDCP-PDU A3 and the like, the RLC-PDU B3 and the like and the MAC-subPDU C3 and the like are correspondingly discarded. However, in the current standard for the 4G system, it is stipulated that, although the PDCP-PDU is discarded, in a case where the sequence number in the RLC layer is already allocated, the RLC-PDU is not correspondingly discarded. In order to fully comply with the standard for the 4G system, in each embodiment in the present application, which is based on these figures, an implementation is also considered in which the RLC-PDU B2 and the like and the MAC-subPDU C2 and the like that corresponds to the MAC-subPDU B2 and the like are not discarded.

Even in the case of this implementation, the discarding notification information in each embodiment in the present application can be applied. In other words, even in the case of this implementation, the discarding notification information in each embodiment in the present application is effective. That is, in a case where the transmission apparatus 100 discards the PDCP-PDU, but the RLC-PDU that corresponds to the PDCP-PDU is not discarded, it is considered that, after all, it is useless to perform the reordering, which accompanies the discarding, on the reception apparatus 200 side. This is because the PDC-PDU that is discarded by the transmission apparatus 100 originally does not have to be desirable in the reception apparatus 200. Even in the case of the implementation as described above, this useless reordering can be avoided ahead of time by utilizing the discarding notification information according to each embodiment in the present application.

According to the tenth embodiment described above, in the same manner as in each of the embodiments described above, in the case where, among the multiple pieces of data, the discarding occurs, the imperfection relating to the reordering processing by the reception apparatus 200 can be corrected without performing the reassigning of the sequence number on the pieces of past-discarding data. Accordingly, according to the tenth embodiment, it is possible that the Ultra-Reliable and Low-latency Communications are realized and that the problem which can correspondingly occur is solved.

Figure 21:
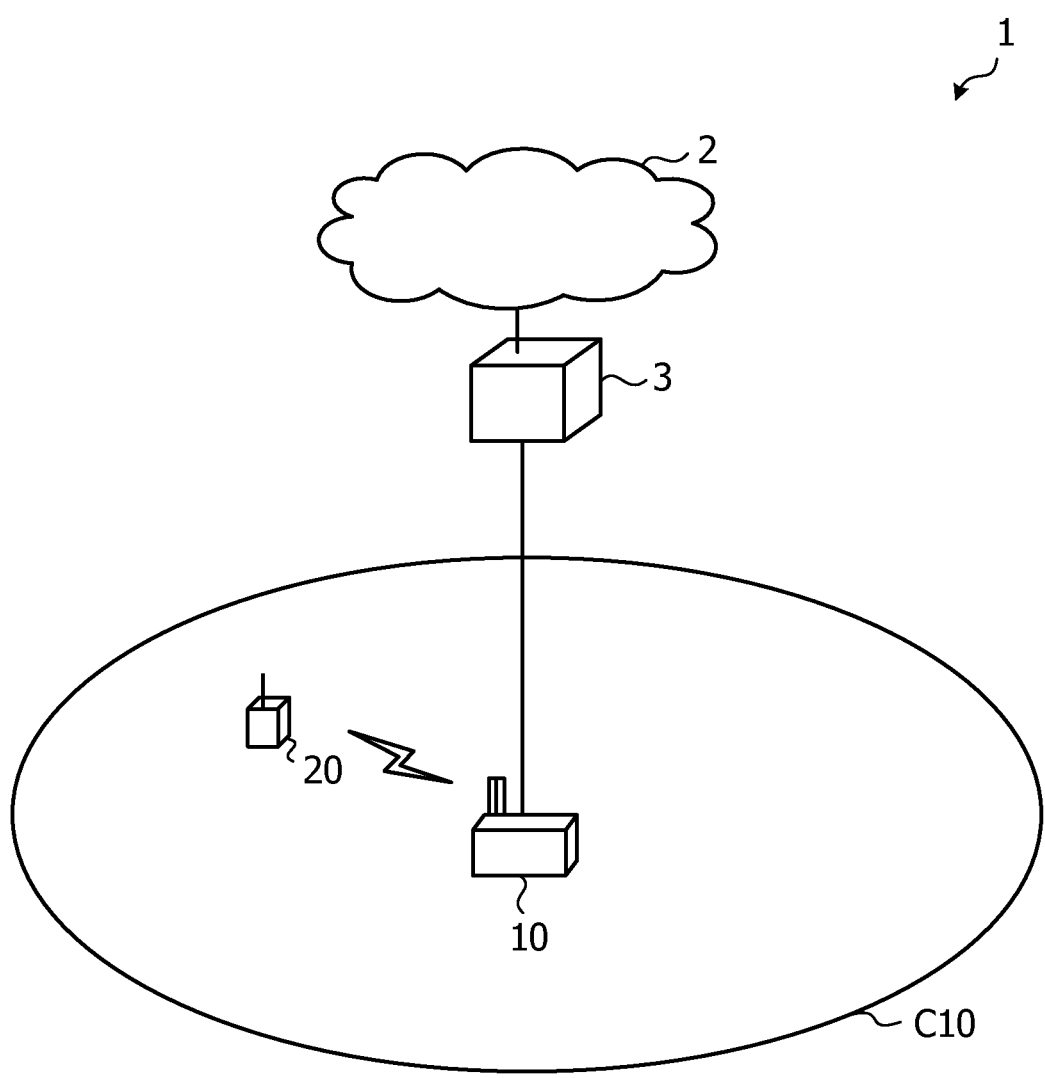
FIG. 21 is a diagram illustrating an example of a network configuration of the wireless communication system according to each embodiment.

Network Configuration of Wireless Communication System according to Each of the Embodiments Next, a network constitution of a wireless communication system 1 according to each embodiment will be described referring to FIG. 21. As illustrated in FIG. 21, a wireless communication system 1 has a wireless base station 10 and a wireless terminal 20. The wireless base station 10 forms a cell C10. The wireless terminal 20 is present within the cell C10.

It is noted that, although repeated, as the transmission apparatus 100 according to each of the embodiments described above, the wireless base station 10 is assumed, but that, in a case the transmission apparatus 100 is the wireless terminal 20, the present disclosure is also essentially available for application. In a case where the transmission apparatus 100 is the wireless base station 10, the reception apparatus 200 is the wireless terminal 20, and the data communication for downlink is a target for the wireless terminal 20. On the other hand, in a case where the transmission apparatus 100 is the wireless terminal 20, the reception apparatus 200 is the wireless base station 10, and the data communication for uplink is a target for the wireless base station 10.

The wireless base station 10 is connected to a network apparatus 3 through a wired connection, and the network apparatus 3 is connected to a network 2 through the wired connection. The wireless base station 10 is provided in a manner that possibly transmits and receives data or control information to and from any other wireless base station through the network apparatus 3 and the network 2. It is noted that the wireless base station 10 may be connected to the network apparatus 3 in a wireless manner instead of in a wired manner.

The wireless base station 10 may be divided into separate apparatuses. One has a function of performing wireless communication with the wireless terminal 20, and the other has a function of performing digital signal processing and a control function. In this case, the apparatus equipped with the wireless communication function is referred to as a Remote Radio Head (RRH), and the device equipped with the digital signal processing and the control function is referred to as a Base Band Unit (BBU). The RRH may be installed in a state of projecting from the BBU, and an optical fiber and the like may provide a connection between the RRH and the BBU in a wired manner. Alternatively, the connection may be provided in a wireless manner. Furthermore, instead of the RRH and BBU, for example, the wireless base station 10 may be divided into two units, a central unit and a distributed unit. The distributed unit includes at least an RF wireless circuit, and, in addition to this, may have a wireless physical layer (or Layer 1), may further have a MAC layer function, and may further have an RLC function.

Furthermore, the wireless base stations 10 may include not only a macro wireless base station and small-sized wireless base stations (including a micro wireless base station, a femto wireless base station, and the like), such as a pico wireless base station, but also variously-sized wireless base stations. Furthermore, in a case where a relay station is used that relays wireless communication between the wireless base station 10 and the wireless terminal 20, the relay station (transmission to and reception from the wireless terminal 20 and control of the transmission and reception) may also be set to be included in the wireless base station 10 in the present application.

On the other hand, the wireless terminal 20 performs communication with the wireless base station 10 through wireless communication.

The wireless terminal 20 may be a wireless terminal, such as a portable telephone, a smartphone, a personal digital assistant (PDA), a personal computer, or an apparatus or equipment (sensing device or the like) that has a wireless communication function. Furthermore, in the case where the relay station is used that relays the wireless communication between the wireless base station 10 and the wireless terminal 20, the relay station (transmission to and reception from the wireless base station 10 and control of the transmission and reception) may also be set to be included in the wireless terminal 20 in the present application.

The network apparatus 3, for example, includes a communication unit and a control unit. These constituent elements are coupled to one another in such a manner that it is possible that a signal or data is input and output in a one-way direction or in a two-way direction. The network apparatus 3, for example, is realized as a gateway. As a hardware constitution of the network apparatus 3, for example, the communication unit is realized as an interface circuit, and the control unit is realized as a processor and a memory.

It is noted that, a specific aspect of distribution or integration of constituent elements of each of the wireless base station and the wireless terminal are not limited to an aspect of the first embodiment. A configuration can also be provided in which all or some of the constituent elements are distributed or integrated functionally or physically in an arbitrary unit according to various supplements, operating conditions, or the like. For example, a connection to the memory as an external device of the wireless base station and the wireless terminal may be established through a network or a cable.

Functional Configuration of Each Apparatus in Wireless Communication System According to Each Embodiment Next, with reference to FIGS. 22 and 23, a functional configuration of each device in the wireless communication system according to each embodiment will be described.

Figure 22:
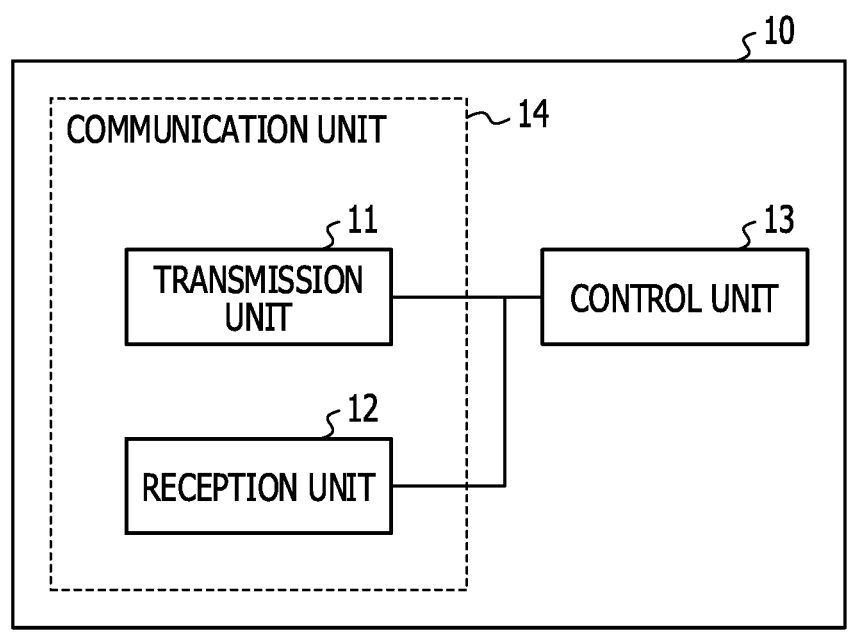
FIG. 22 is an example of a diagram illustrating a functional configuration of a wireless base station in the wireless communication system according to each embodiment.

FIG. 22 is a functional block diagram illustrating a configuration of the wireless base station 10. As illustrated in FIG. 22, the wireless base station 10 includes a transmission unit 11, a reception unit 12, and a control unit 13. These constituent components are coupled to one another in such a manner that it is possible that a signal or data is input and output in a one-way direction or in a two-way direction. It is noted that the transmission unit 11 and the reception unit 12 are collectively referred to as a communication unit 14.

The transmission unit 11 transmits a data signal or a control signal through an antenna using the wireless communication. It is noted that the antenna may be shared for transmission and reception. The transmission unit 11, for example, transmits a downlink signal through a downlink data channel or control channel. Downlink data channels, for example, include a Physical Downlink Shared Channel (PDSCH). Furthermore, the downlink control channels, for example, include a Physical Downlink Control Channel (PDCCH). Signals that are transmitted, for example, include an L1/L2 control signal that is transferred to the wireless terminal 20 in a connected state on a control channel, a user data signal that is transferred to the wireless terminal 20 in the connected state on a data channel, or a radio resource control (RRC) control signal. Furthermore, the signals that are transmitted, for example, include a synchronization signal and a reference signal that is used for channel estimation or downlink wireless circuit quality measurement.

Signals that are transmitted by the transmission unit 11 include all signals that are transmitted by the wireless base station 10 according to each of the embodiments and the modification example, which are described above.

The reception unit 12 receives the data signal or the control signal that is transmitted from the wireless terminal 20 through the antenna using first wireless communication. The reception unit 12, for example, receives an uplink signal through the uplink data channel or control channel. Uplink data channels, for example, include a Physical Uplink Shared Channel (PUSCH). Furthermore, uplink control channels, for example, include a Physical Uplink Control Channel (PUCCH). Signals that are received, for example, include the L1/L2 control signal that is transferred from the wireless terminal 20 in the connected state on the control channel, the user data signal that is transferred from the wireless terminal 20 in the connected state on the data channel, or the radio resource control (RRC) control signal. Furthermore, the signals that are received, for example, include a reference signal that is used for channel estimation or uplink wireless circuit quality measurement.

Signals that are received by the reception unit 12 include all signals that are received by the wireless base station 10 according to each of the embodiments and the modification example, which are described above.

The control unit 13 outputs data or control information that is to be transmitted, to the transmission unit 11. The control unit 13 inputs the data or the control information that is to be received, into the reception unit 12. The control unit 13 acquires the data or the control information from the network apparatus 3 or any other wireless base station through the wired connection or the wireless connection. In addition to these, the control unit performs various controls relating to various transmission signals that are transmitted by the transmission unit 11, or various reception signals that are received by the reception unit 12.

Processing operations that are controlled by the control unit 13 include all processing operations that are performed by the wireless base station 10 according to each of the embodiments and the modification example, which are described above.

Figure 23:
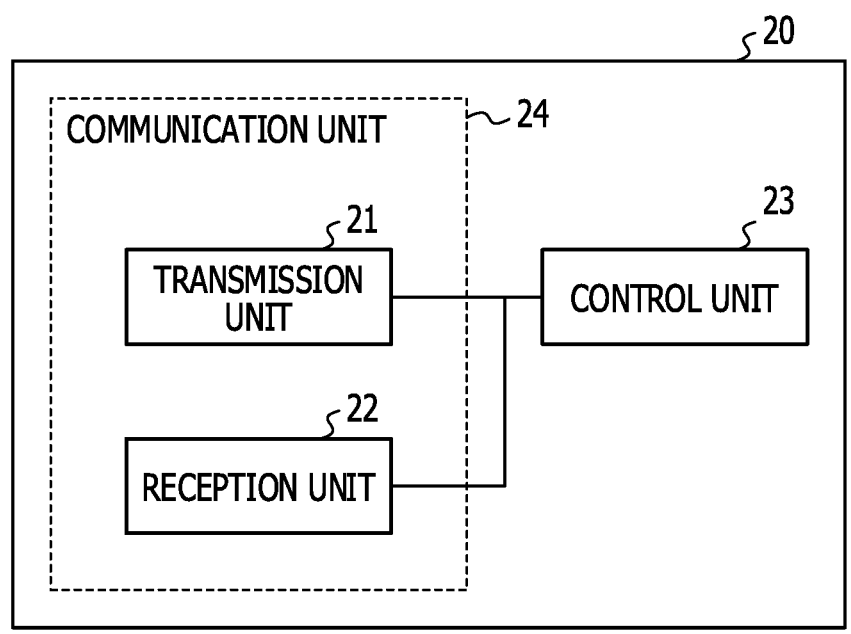
FIG. 23 is an example of a diagram illustrating a functional configuration of a wireless terminal in the wireless communication system according to each embodiment.

FIG. 23 is a functional configuration diagram illustrating a configuration of the wireless terminal 20. As illustrated in FIG. 23, the wireless terminal 20 includes a transmission unit 21, a reception unit 22, and a control unit 23. These constituent components are coupled to one another in such a manner that it is possible to input and output a signal or data in a one-way direction or in a two-way direction. It is noted that the transmission unit 21 and the reception unit 22 are collectively referred to as a communication unit 24.

The transmission unit 21 transmits a data signal or a control signal through the antenna using the wireless communication. It is noted that the antenna may be shared for transmission and reception. The transmission unit 21, for example, transmits an uplink signal through an uplink data channel or control channel. Uplink data channels, for example, include a Physical Uplink Shared Channel (PUSCH). Furthermore, uplink physical control channels, for example, include the Physical Uplink Control Channel (PUCCH). Signals that are transmitted, for example, include the L1/L2 control signal that is transferred to the wireless base station 10 that makes a connection, on a control channel, the user data signal that is transferred to the wireless base station 10 that makes a connection, on the data channel, or the radio resource control (RRC) control signal. Furthermore, the signals that are transmitted, for example, include a reference signal that is used for channel estimation or demodulation.

Signals that are transmitted by the transmission unit 21 include all signals that are transmitted by the wireless terminal 20 according to each of the embodiments and the modification example, which are described above.

The reception unit 22 receives the data signal or the control signal that is transmitted from the wireless base station 10 through the antenna using the wireless communication. The reception unit 22, for example, receives the downlink signal through the downlink data channel or control channel. Downlink data channels, for example, include the Physical Downlink Shared Channel (PDSCH). Furthermore, the downlink control channels, for example, include the Physical Downlink Control Channel (PDCCH). Signals that are received, for example, include the L1/L2 control signal that is transferred from the wireless base station 10 that makes a connection, on the control channel, the user data signal that is transferred from the wireless base station 10 that makes a connection, on the data channel, or the radio resource control (RRC) control signal. Furthermore, the signals that are received, for example, include the reference signal that is used for the channel estimation or the demodulation.

Signals that are received by the reception unit 22 include all signals that are received by the wireless terminal 20 according to each of the embodiments and the modification example, which are described above.

The control unit 23 outputs data or control information that is to be transmitted, to the transmission unit 21. The control unit 23 inputs the data or the control information that is to be received, into the reception unit 22. The control unit 23 acquires the data or the control information from the network apparatus 3 or any other wireless base station through the wired connection or the wireless connection. In addition to these, the control unit performs various controls relating to various transmission signals that are transmitted by the transmission unit 21, or various reception signals that are received by the reception unit 22.

Processing operations that are controlled by the control unit 23 include all processing operations that are performed by the wireless terminal 20 according to each of the embodiments and the modification example, which are described above.

It is noted that the PDSCH, the PDCCH, the PUSCH, and the PUCCH, which are described above, are names of wireless physical channels that are used in a wireless access unit of an LTE system, but that, of course, each embodiment in the present application is not limited to these. That is, needless to say, there is a likelihood that these will be different from names of wireless physical channels in the 5G system or the like, but it is desirably noted that these can apply to each embodiment in the present application.

Hardware Configuration of Each Apparatus in Wireless Communication System According to Each Embodiment A hardware configuration of each apparatus in the wireless communication system according to each embodiment and each modification example is described with reference to FIGS. 24 and 25.

Figure 24:
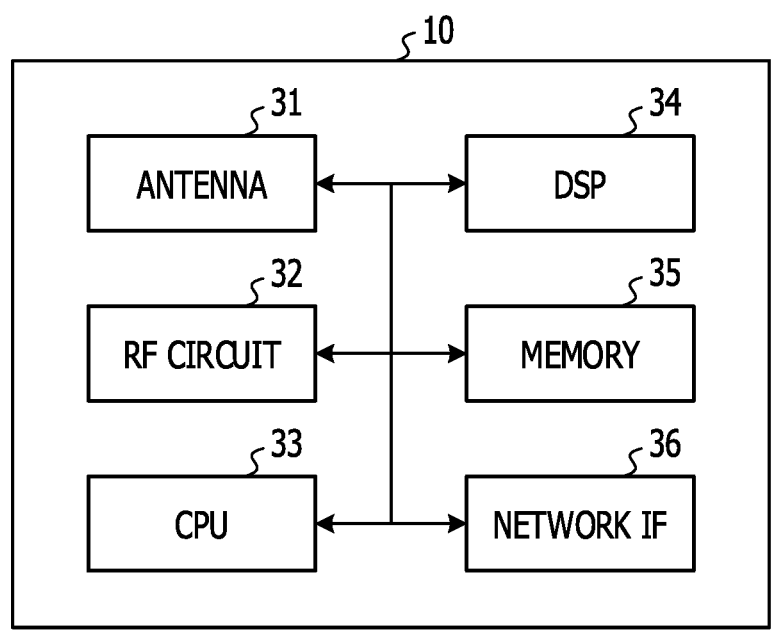
FIG. 24 is an example of a diagram illustrating a hardware configuration of the wireless base station in the wireless communication system according to each embodiment.

FIG. 24 is a diagram illustrating a hardware configuration of the wireless base station 10. As illustrated in FIG. 24, the wireless base station 10, for example, has a radio frequency (RF) circuit 32 including an antenna 31, a central processing unit (CPU) 33, a digital signal processor (DSP) 34, a memory 35, and a network interface (IF) 36, as hardware constituent elements. The CPU is connected in such a manner that it is possible to input and output various signals or pieces of data through a bus. The memory 35, for example, includes at least any one of a Random Access Memory (RAM), such as a Synchronous Dynamic Random Access Memory (SDRAM), a Read Only Memory (ROM), and a flash memory. A program, control information, or data is stored in the memory 35.

A correspondence between a functional configuration of the wireless base station 10 that is illustrated in FIG. 22 and a hardware configuration of the wireless base station 10 that is illustrated in FIG. 24 is described. The transmission unit 11 and the reception unit 12 (or the communication unit 14), for example, are realized by an RF circuit 32, or an antenna 31 and the RF circuit 32. The control unit 13, for example, is realized by the CPU 33, the DSP 34, the memory 35, a digital electronic circuit that is not illustrated, or the like. Examples of the digital electronic circuits include an Application Specific Integrated Circuit (ASIC), a Field-Programing Gate Array (FPGA), a Large Scale Integration (LSI), and the like.

It is noted that in the wireless base station 10, multiple data signals that are transmitted in multiple subbands are generated, but that filters that generate these may be configured independently of every subband.

Figure 25:
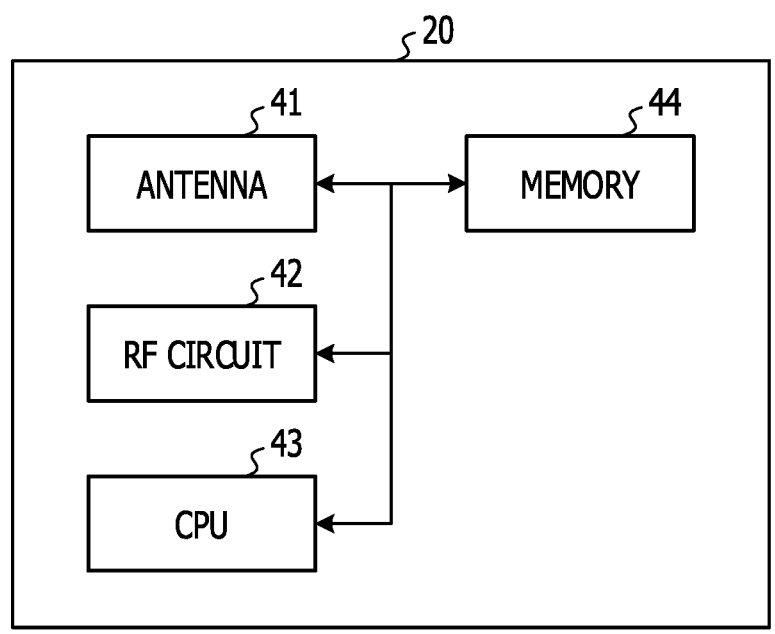
FIG. 25 is an example of a diagram illustrating a hardware configuration of the wireless terminal in the wireless communication system according to each embodiment.

FIG. 25 is a diagram illustrating a hardware configuration of the wireless terminal 20. As illustrated in FIG. 25, the wireless terminal 20, for example, has an RF circuit 42 including an antenna 41, a CPU 43, and a memory 44, as hardware constituent elements. Moreover, the wireless terminal 20 may include a display device, such as a liquid crystal display (LCD), which is coupled to the CPU 43. The memory 44, for example, includes at least any one of a RAM, such as an SDRAM, a ROM, and a flash memory. A program, control information, or data is stored in the memory 44.

A correspondence between a functional configuration of the wireless terminal 20 that is illustrated in FIG. 23 and a hardware configuration of the wireless terminal 20 that is illustrated in FIG. 25 is described. The transmission unit 21 and the reception unit 22 (or the communication unit 24), for example, are realized by an RF circuit 42, or an antenna 41 and an RF circuit 42. The control unit 23, for example, is realized by the CPU 43, the memory 44, a digital electronic circuit that is not illustrated, and the like. Examples of the digital electronic circuit include an ASIC, an FPGA, an LSI, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A first wireless communication apparatus comprising:
controller circuitry configured to, in the first wireless communication apparatus that is different from a second wireless communication apparatus:
perform numbering of multiple pieces of data;
control to transmit the multiple pieces of data that are numbered by the first wireless communication apparatus, to the second wireless communication apparatus; and
structure a Medium Access Control protocol data unit (MAC-PDU), in response to specific data among the multiple pieces of data being discarded by the first wireless communication apparatus after the numbering by the first wireless communication apparatus and before transmission, by the first wireless communication apparatus, of the structured MAC-PDU, the structuring of the MAC-PDU by the first wireless communication apparatus being performed without renumbering, by the first wireless communication apparatus, of the multiple pieces of data subsequent to the discarding by the first wireless communication apparatus,
the structured MAC-PDU including:
the multiple pieces of data subsequent to the discarding by the first wireless communication apparatus, the multiple pieces of data in the structured MAC-PDU having not been transmitted by the first wireless communication apparatus to the second wireless communication apparatus, after the numbering of the multiple pieces of data; and
discarding notification information indicating that the specific data have been discarded by the first wireless communication apparatus; and
a transmitter configured to:
in a state where a missing number occurs as a result of the numbering that depends on the discarding by the first wireless communication apparatus, transmit the structured MAC-PDU from the first wireless communication apparatus to the second wireless communication apparatus, the multiple pieces of data subsequent to the discarding, and the discarding notification information being included in the same transmitted MAC-PDU.

2. The first wireless communication apparatus according to claim 1, wherein the controller circuitry performs numbering of the multiple pieces of data corresponding to a plurality of protocol layers or sublayers, and performs a first processing in a case where, among the multiple pieces of data, a specific data set in at least one protocol layer or sublayer is discarded after the numbering and before transmitting the multiple pieces of data.

3. The first wireless communication apparatus according to claim 1, wherein the discarding notification information is included in a Medium Access Control (MAC) Control Element (CE).

4. The first wireless communication apparatus according to claim 2, wherein the plurality of protocol layers or sublayers include is at least one of: a Packet Data Convergence Protocol (PDCP) layer; a Radio Link Control (RLC) layer; and a Medium Access Control (MAC) layer.

5. The first wireless communication apparatus according to claim 2, wherein the multiple pieces of data corresponding to each of the plurality of protocol layers or sublayers are structured as at least one of a protocol data unit (PDU) and a service data unit (SDU) according to a hierarchy of each of the plurality of protocol layers or sublayers.

6. The first wireless communication apparatus according to claim 2, wherein the first processing is configured to generate the discarding notification information.

7. The first wireless communication apparatus according to claim 1, wherein each piece of the multiple pieces of data in the structured MAC-PDU has not been transmitted by the first wireless communication apparatus to the second wireless communication apparatus, after the numbering of the multiple pieces of data.

8. The first wireless communication apparatus according to claim 1, wherein the controller circuitry is further configured to discard specific data among the multiple pieces of data in accordance with an elapsed time counted by a timer in a Packet Data Convergence Protocol (PDCP) layer.

9. The first wireless communication apparatus according to claim 1, wherein the controller circuitry is further configured to notify, to a MAC layer, information regarding discarding of the specific data in a layer that is upper than the MAC layer.

10. The first wireless communication apparatus according to claim 9, wherein the controller circuitry is further configured to structure the MAC-PDU in response to the MAC layer being notified of the information regarding the discarding in the layer upper than the MAC layer.

11. The first wireless communication apparatus according to claim 9, wherein the layer upper than the MAC layer is a Packet Data Convergence Protocol (PDCP) layer.

12. The first wireless communication apparatus according to claim 1, wherein the specific data indicated by the discarding notification information in the MAC-PDU is discarded in a layer that is upper than a MAC layer.

13. The first wireless communication apparatus according to claim 1, wherein the specific data is discarded in a Packet Data Convergence Protocol (PDCP) layer, and wherein the multiple pieces of data subsequent to the discarding in the PDCP layer, and the discarding notification information, which is related to the discarding in the PDCP layer, are included in the same transmitted MAC-PDU.

14. A second wireless communication apparatus comprising:
a receiver configured to receive a Medium Access Control protocol data unit (MAC-PDU), from a first wireless communication apparatus that is different from the second wireless communication apparatus, by the second wireless communication apparatus,
the MAC-PDU being received by the receiver of the second wireless communication apparatus in a case where, among multiple pieces of data, specific data has been discarded by the first wireless communication apparatus after numbering of the multiple pieces of data by the first wireless communication apparatus and before transmission, by the first wireless communication apparatus, of the MAC-PDU,
the MAC-PDU including:
the multiple pieces of data subsequent to the discarding by the first wireless communication apparatus, the multiple pieces of data in the MAC-PDU being numbered by the first wireless communication apparatus, the multiple pieces of data in the MAC-PDU being not renumbered by the first wireless communication apparatus after the numbering, and the multiple pieces of data in the MAC-PDU having not been transmitted by the first wireless communication apparatus to the second wireless communication apparatus, after the numbering of the multiple pieces of data; and
discarding notification information indicating that the specific data have been discarded by the first wireless communication apparatus; and
controller circuitry configured to perform rearranging processing on the multiple pieces of data that are received in the MAC-PDU, based on the numbering,
in a state where a missing number occurs as a result of the numbering that depends on the discarding by the first wireless communication apparatus, the MAC-PDU being received, from the first wireless communication apparatus by the second wireless communication apparatus, and
the multiple pieces of data subsequent to the discarding, and the discarding notification information being included in the same received MAC-PDU.

15. The second wireless communication apparatus according to claim 14, wherein the controller circuitry is further configured to perform the rearranging processing with the specific data as being discarded, based on the discarding notification information.

16. A wireless communication system comprising:
a first wireless communication apparatus; and
a second wireless communication apparatus, the first wireless communication apparatus being configured to:
perform numbering of multiple pieces of data;
transmit the multiple pieces of data that are numbered to the second wireless communication apparatus,
structure a Medium Access Control protocol data unit (MAC-PDU), in response to specific data among the multiple pieces of data being discarded by the first wireless communication apparatus after the numbering by the first wireless communication apparatus and before transmission, by the first wireless communication apparatus, of the structured MAC-PDU,
the structuring of the MAC-PDU by the first wireless communication apparatus being performed without renumbering, by the first wireless communication apparatus, of the multiple pieces of data subsequent to the discarding by the first wireless communication apparatus,
the structured MAC-PDU including:
the multiple pieces of data subsequent to the discarding by the first wireless communication apparatus, the multiple pieces of data in the structured MAC-PDU having not been transmitted by the first wireless communication apparatus to the second wireless communication apparatus, after the numbering of the multiple pieces of data; and
discarding notification information indicating that the specific data have been discarded by the first wireless communication apparatus, and transmit, in a state where a missing number occurs as a result of the numbering that depends on the discarding by the first wireless communication apparatus, the structured MAC-PDU from the first wireless communication apparatus to the second wireless communication apparatus, the multiple pieces of data subsequent to the discarding, and the discarding notification information being included in the same transmitted MAC-PDU.

* * * * *